United States Patent [19]
Minagawa et al.

[11] Patent Number: 4,567,667
[45] Date of Patent: Feb. 4, 1986

[54] METHOD AND APPARATUS FOR MEASURING THE INCLINATION OF THE WHEELS OF AN AUTOMOBILE

[75] Inventors: Koji Minagawa, Chiba; Yutaka Fukuda, Tokorozawa; Hiroichi Nabeshima, Hidakamachi; Shinichi Watanabe, Sayama; Masamichi Ikeda, Kawagoe, all of Japan

[73] Assignee: Honda Giken Kogyo Kabushikikaisha, Tokyo, Japan

[21] Appl. No.: 683,072

[22] Filed: Dec. 18, 1984

[30] Foreign Application Priority Data

Jan. 24, 1984 [JP] Japan ............................ 59-9502
Aug. 3, 1984 [JP] Japan ............................ 59-162836

[51] Int. Cl.⁴ .................................. G01B 7/315
[52] U.S. Cl. ............................. 33/203.12; 33/203.14
[58] Field of Search ............... 33/203.12, 203, 203.14, 33/203.18, 288

[56] References Cited

U.S. PATENT DOCUMENTS

| | | | |
|---|---|---|---|
| 2,025,051 | 12/1935 | Haucke | 33/203.12 |
| 2,133,827 | 10/1938 | Miller | 33/203.12 |
| 2,378,631 | 6/1945 | Holmes | 33/203.12 |
| 3,680,369 | 8/1972 | Merrill | 33/203.14 |
| 3,823,485 | 7/1974 | Lambrecht | 33/203.14 |
| 4,429,467 | 2/1984 | Murata et al. | 33/203 |
| 4,445,278 | 5/1984 | Staudinger | 33/203.12 |

Primary Examiner—Willis Little
Attorney, Agent, or Firm—Alan H. MacPherson; Steven F. Caserza; Richard Franklin

[57] ABSTRACT

A method and apparatus for measuring the inclination of the wheels of an automobile is provided. In accordance with one form of the present invention, there is provided a toe angle detecting device including a pair of detector plates which are normally spaced apart from each other to allow the corresponding wheel of the automobile to be located therebetween and which are pressed against the wheel from both sides when activated to determine the inclination of the wheel with respect to the longitudinal center line of the vehicle, i.e., toe angle of the wheel. In another aspect, a particular link mechanism is provided to interconnect four support members on which the four wheels of the automobile are placed, and the link mechanism is structured to determine the direction of the longitudinal center line of the automobile with respect to the reference line of the link mechanism.

26 Claims, 24 Drawing Figures

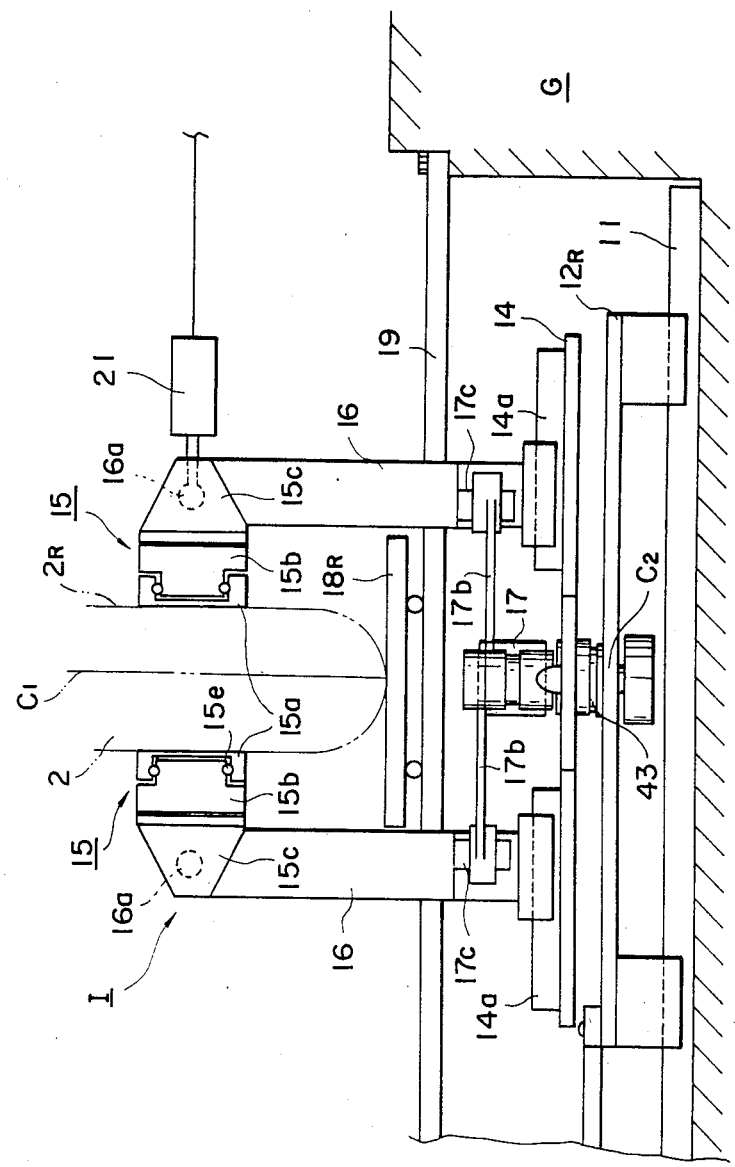

METHOD AND APPARATUS FOR MEASURING THE INCLINATION OF THE WHEELS OF AN AUTOMOBILE

BACKGROUND OF THE INVENTION

1. Field of the Invention

This invention generally relates to a method and apparatus for testing the wheels of a vehicle and in particular to a method and apparatus for measuring the inclination of the wheels of a vehicle, such as an automobile. More specifically, the present invention relates to a method and apparatus for measuring the toe-in/toe out of each of the wheels of a vehicle.

2. Description of the Prior Art

An automobile generally has four wheels which are arranged in particular orientations from various considerations. For example, the front wheels are arranged in consideration of such parameters as toe-in/toe-out, camber, caster and kingpin angle so as to secure stability in steering operation. It is often required to determine these parameters properly in order to secure the running stability of an automobile as a whole. Above all, proper setting of toe-in/toe-out condition is extremely important because this setting is directly related to the operative association between the steering wheel and the direction of movement of the automobile.

Although it is well known for one skilled in the art, the toe-in/toe-out condition will be explained with reference to FIG. 1 for the sake of clarity. The particular arrangement of wheels 2, 2 of an automobile 1 illustrated in FIG. 2 indicates the toe-in condition, wherein, when viewed from above in plan view, the wheels 2, 2 are inclined inwardly with respect to the forward direction D of movement of the automobile 1. Toe-out is the condition in which the wheels 2, 2 are inclined outwardly, i.e., the rear parts of the wheels 2, 2 are closer together than the forward parts of the wheels 2, 2 with respect to the forward direction D of movement of the automobile 1. For the matter of convenience, here, the angle $\theta$ defined between the forward direction D of movement of the automobile 1 and the center plane of each of the wheels 2, as shown in FIG. 1, will be referred to as a toe angle.

In order to set the steering wheel of an automobile properly with respect to the direction of advancement of the automobile or the imaginary center line extending from the front to the rear, it is required to first measure the inclination of each of the right and left wheels with respect to the center plane of the automobile, i.e., the toe angle of each of the right and left wheels, and to adjust the inclination of each of the left and right wheels until they become symmetrically inclined with respect to the center plane of the automobile. Any of the prior art methods and apparatus for measuring the toe angle was appreciably affected by various measuring conditions, including the size and kind of tires encircling and fitting the rim of the wheels and the air pressure of each of these tires, and, thus, it was extremely difficult to measure the toe angle at high accuracy. Among the prior art systems for measuring the toe angle of a wheel, there was one using a detector plate which was pressed against the outer side surface of a wheel for measuring the toe angle thereof. In this case, however, there were variations in the suspension system as a whole when the detector plate was pressed against the wheel, so that accurate measurement could not be carried out.

Recently, automobiles having four wheels which are all independently suspended have become increasingly popular because of riding comfort and reduction of weight. In such automobiles having independently suspended front and rear wheels, it is necessary to check and adjust each of the four wheels from time to time.

SUMMARY OF THE INVENTION

It is therefore a primary object of the present invention to obviate the disadvantages of the prior art as described above and to provide an improved method and apparatus for measuring the inclination of the wheels of a vehicle, such as an automobile, at high accuracy.

Another object of the present invention is to provide an improved system for measuring the toe angle of each of the wheels of a vehicle, such as an automobile, at high accuracy and with ease.

A further object of the present invention is to provide an improved method and apparatus capable of measuring the inclination, or toe angle, of each of the wheels of a vehicle, such as an automobile, at the same time.

A still further object of the present invention is to provide an improved method and apparatus for measuring the inclination of the wheels of a vehicle, such as an automobile, at high accuracy irrespective of the difference in model of vehicles.

A still further object of the present invention is to provide an improved method and apparatus for measuring the inclination of the wheels of a vehicle, such as an automobile, without being affected by the differing conditions of tires encircling and fitting the rim of the wheel.

A still further object of the present invention is to provide an improved system for measuring the inclination, or toe angle, of the wheels of a vehicle, such as an automobile, which is sturdy in structure and reliable in operation.

Other objects, advantages and novel features of the present invention will become apparent from the following detailed description of the invention when considered in conjunction with the accompanying drawings.

BRIEF DESCRIPTION OF THE DRAWINGS

FIG. 4 is a front view of the structure shown in FIG. 3;

DESCRIPTION OF THE PREFERRED EMBODIMENTS

Figure 2:
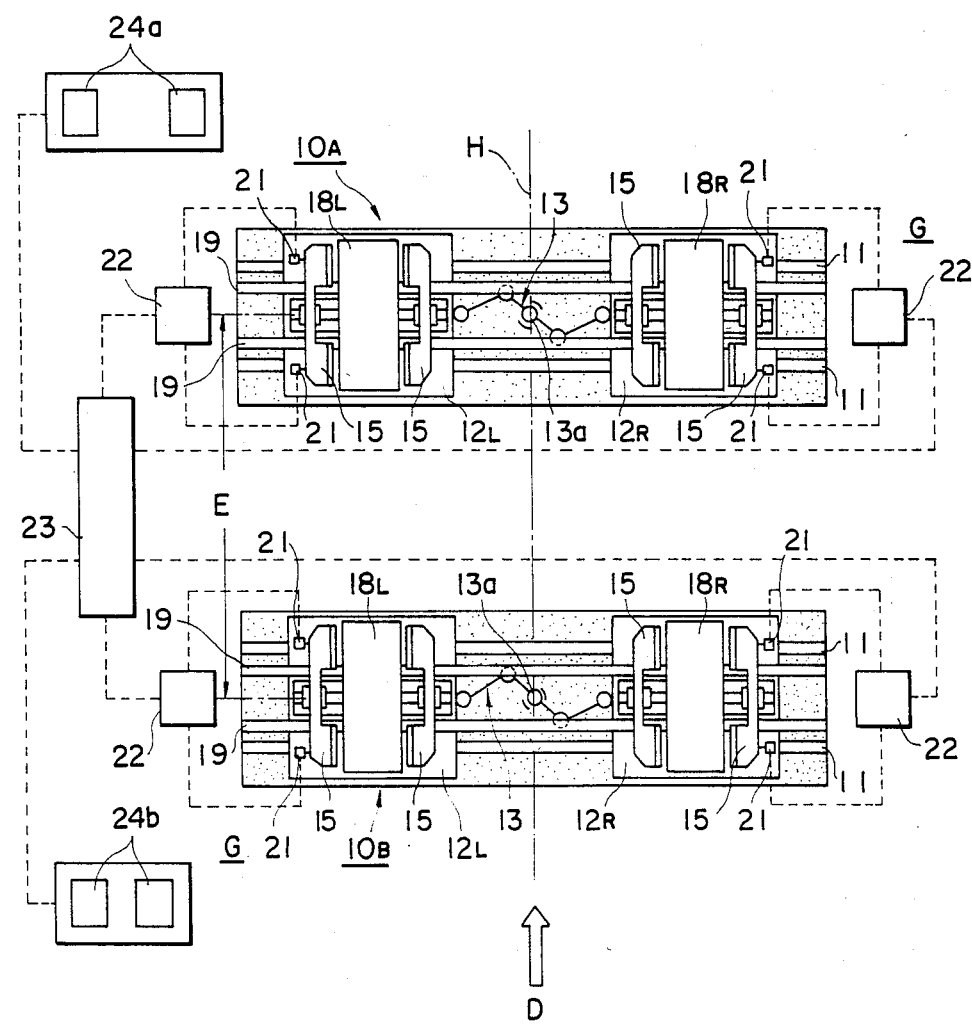
FIG. 2 is a schematic illustration showing a system for measuring the inclination of wheels of an automobile constructed in accordance with one embodiment of the present invention.

Referring now to FIG. 2, there is schematically shown a system for measuring the inclination, or toe angle, of the wheels of an automobile having four wheels constructed in accordance with one embodiment of the present invention. As shown, the toe angle measuring system generally comprises a front wheel measuring section $10_A$ and a rear wheel measuring section $10_B$, which is spaced apart from the front wheel measuring section $10_A$ by a distance E corresponding to a wheel base distance of an automobile to be examined. If desired, the toe angle measuring system may be so constructed that the distance E may be varyingly set in accordance with the wheel base distance of an automobile to be examined as is obvious for those skilled in the art. In the illustrated embodiment, since the front and rear toe angle measuring sections $10_A$ and $10_B$ are identically constructed, like elements are designated by like numerals.

The rear wheel measuring section $10_B$ is generally defined in a rectangular pit extending into the ground from a ground surface G on which automobiles run. The rear wheel measuring section $10_B$ includes a pair of support beams 19, 19, which are fixedly attached to the ground surface G and extend horizontally in parallel, and a pair of floating tables $18_R$ and $18_L$, which are movably supported on the pair of beams 19, 19 along the longitudinal direction thereof with their top surfaces generally flush with the ground surface G thereby allowing an automobile to be examined to be driven onto the floating plates $18_R$ and $18_L$. It is so structured that the floating plates $18_R$ and $18_L$ are locked in position when an automobile is driven thereon; whereas, these plates $18_R$ and $18_L$ are released during toe angle measurements.

Also provided is a pair of rails 11, 11 which are fixed at the bottom of the pit and extended horizontally in parallel. On the rails 11, 11 are mounted a pair of support plates $12_R$, $12_L$ movable along the logitudinal direction of the rails 11, 11, and these support plates $12_R$, $12_L$ are operatively connected by a connector 13, which is commonly called "equalizer". The connector 13 has a center point 13a, which is fixed in position, and, thus, the left and right support plates $12_R$, $12_L$ are controlled to be located symmetrically in position with respect to this stationary center point 13a. As is clear from FIG. 2, the front wheel measuring section $10_A$ also includes a similar connector 13 having a stationary center point 13a, and, it is to be noted that an imaginary straight line H connecting between these stationary center points 13a, 13a of front and rear measuring sections $10_A$ and $10_B$ defines a reference straight line for measurement of toe angle.

With this structure, it is possible to carry out toe angle measurements for various automobiles different in wheel separation, and, moreover, just by having an automobile set in position as self-driven, it is automatically aligned with the reference straight line H. In other words, the longitudinal center line of the automobile is aligned with the reference straight line H. It is to be noted that here the longitudinal center line of an automobile is defined as a straight line extending between the center of the front wheel separation (length between the two front wheels) and the center of the rear wheel separation.

Figure 3:
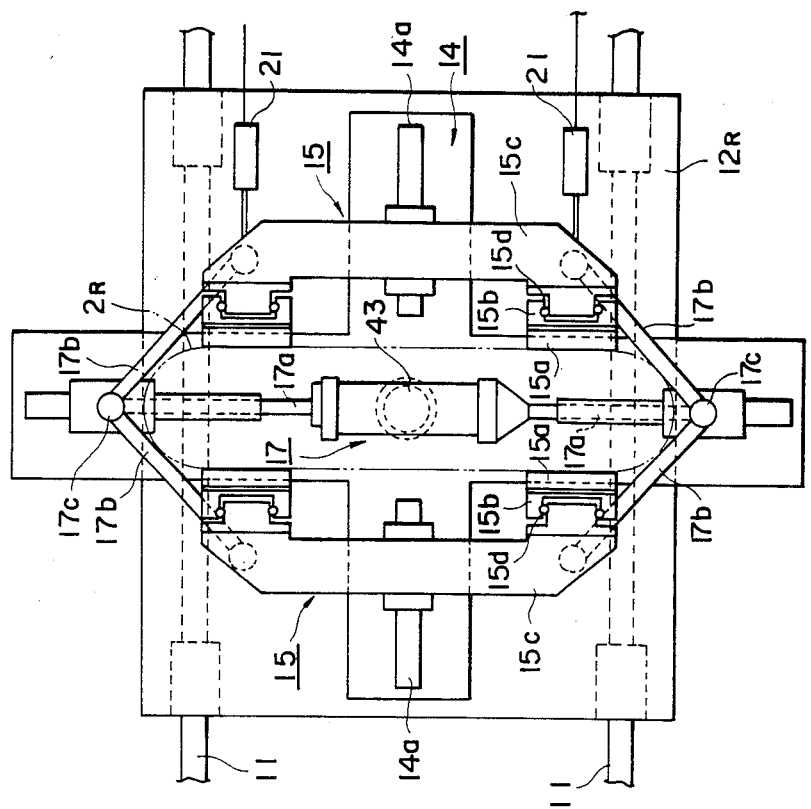
FIG. 3 is a plan view showing in detail one of the toe angle detecting devices provided in the system of FIG. 2.
Figure 1:
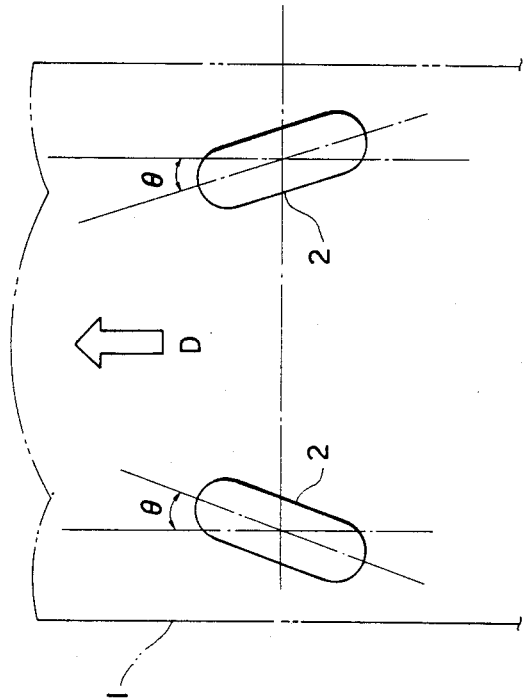
FIG. 1 is a schematic illustration which is useful for explaining the toe-in/toe-out condition of wheels of an automobile.

As best shown in FIGS. 3 and 4, a turn table 14 in the form of a cross in the illustrated embodiment is rotatably mounted on each of the support plates $12_R$, $12_L$ via a shaft 43. On the turn table 14 is provided a toe angle detecting device including a pair of detector plates 15, 15 which may be moved closer together or separated away from each other through a suitable link mechanism and thus which may be pressed against the wheel 2 set on the floating table $18_R$ from both sides so as to detect the inclination of the wheel 2. Each of the detector plates 15, 15 includes a support member 15c, a pair of spacers 15b, 15b which are mounted on the support member 15c on both ends each through a ball bearing 15d so as to be movable in the vertical direction, and a pair of contact plates 15a, 15a which are mounted on the respective spacers 15b, 15b through respective ball bearings 15e, 15e to be movable horizontally with respect thereto and which are directly brought into contact with the wheel 2 on both sides thereof.

Figure 5A:
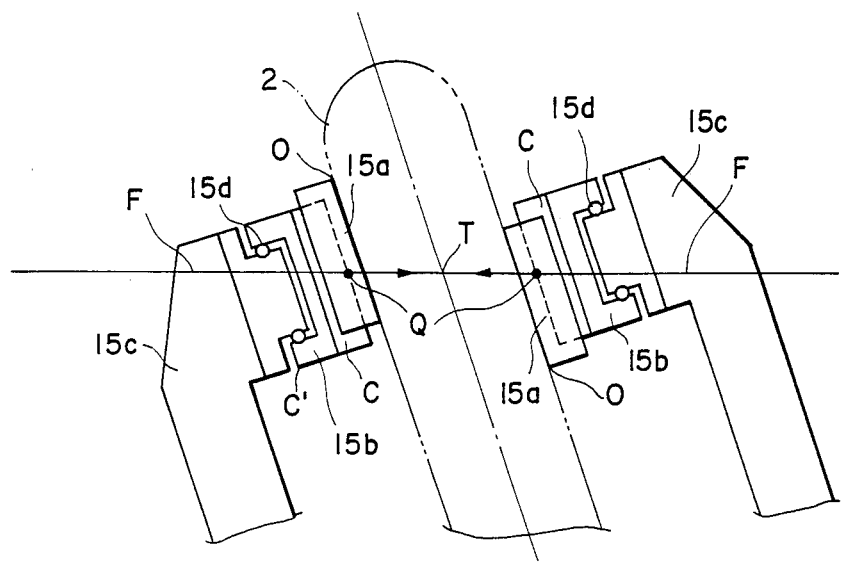
FIGS. 5a and 5b are schematic illustrations which are useful for explaining the operation of the system shown in FIG. 2.
Figure 5B:
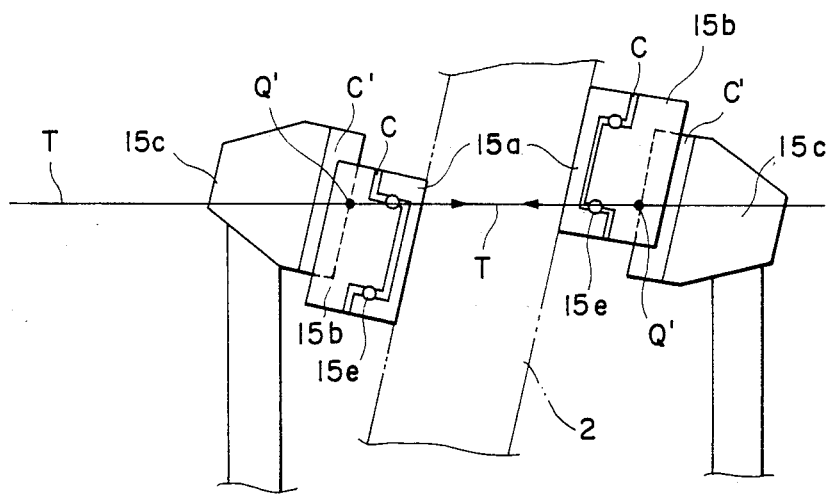

With reference to FIGS. 5a and 5b, the operation of the toe angle detecting device having the above-described structure will be described. Due to the unique structure of the present toe angle detecting device, the pair of detector plates 15, 15 may be brought into pressure contact with the wheel 2 from both sides without imparting any undesired force to the wheel 2 and thus to its suspension system. Described more in detail in this respect, when the detector plates 15, 15 are pressed against the wheel 2 from both sides, pressing forces F, F applied by the respective detector plates 15, 15 to the wheel 2 are counterbalanced along an imaginary horizontal line T. In other words, when the detector plates 15, 15 are moved closer to the wheel 2 from both sides, an edge O of the contact plate 15a first comes into contact with the corresponding side surface of the wheel 2 and the contact plate 15a pivots around the edge O now in contact with the wheel 2 until the contact plate 15a comes into surface contact with the wheel 2. However, the spacer 15b does not follow the movement of the contact plate 15a, but it moves slidingly along an interface C between the contact plate 15a and the spacer 15b through the ball bearing 15e thereby causing a point Q of application of pressing force to be located at line T. With such a structure, even if the pair of detector plates 15, 15 are brought into pressure contact with the wheel 2 from both sides, undesired forces are prevented from being applied to the wheel and its suspension system, thereby allowing to carry out toe angle measurements at high accuracy.

Furthermore, as shown in FIG. 5b, the present toe angle detecting device is also so structured not to be adversely affected by the camber of the wheel 2, i.e., the inclination of the wheel 2 in the vertical direction. That is, in the illustrated embodiment, since the ball bearing 15d is provided at the interface C' between the spacer 15b and the support member 15c thereby allowing to provide a relative movement therebetween, the point Q' of application of pressing force when viewed in the plane vertical to the plane of FIG. 5a is also properly located at the line T so that the pressing forces are also counterbalanced. This also indicates that no undesired forces are applied to the wheel 2. In this manner, according to the present invention, since the wheel 2 is pressed from both sides with well counterbalanced forces, no undesired forces are applied to the wheel 2 so that the measurement of the toe angle of the wheel 2 may be carried out at high accuracy.

As best shown in FIG. 4, the detector plate 15 is supported to be pivotal around pivot 16a at the top of a stay 16, which extends upright with its bottom end slidably mounted on a guide rail 14a. Thus, the detector plate 15 may be freely pivotted to face upward or downward depending on the inclination of the side surface of the wheel 2 against which it is pressed. As shown, a pair of such guide rails 14a, 14a are fixedly mounted on the cross-shaped turn table 14 and spaced apart from each other and in alignment. On the turn table 14 and at the center between the pair of detector plates 15, 15 is also provided an air cylinder 17 extending in the direction perpendicular to the longitudinal direction of the guide rails 14a, 14a. The air cylinder 17 includes a pair of rods 17a, 17b which are provided on both ends thereof and which may project and retract in opposite directions. Each of the rods 17a, 17b has a pin 17c at its forward end and a pair of levers 17b, 17b are pivotally connected to the pin 17c at one end with the other end pivotally connected to the stay 16.

With the above-described structure, when air under pressure is supplied from a pressurized air source (not shown) to the air cylinder 17, the oppositely arranged rods 17a, 17b project in the opposite directions, which, in turn, cause the pair of stays 16, 16 and thus the detector plates 15, 15 to move closer together as guided along the guide rails 14a, 14a through the above-mentioned link mechanism including the levers 17b. Thus, with the supply of air under pressure to the air cylinder, the detector plates 15, 15 are brought into pressure contact with the wheel 2 from both sides.

Regarding the toe angle detecting device for the right-hand wheel $2_R$ as shown in FIG. 4, there is provided a pair of sensors 21, 21, each having its tip end in contact with the corresponding one of the pair of shafts 17c, 17c, which extend downward from the stay 6 and to which the levers 17b, 17b are pivotally connected, respectively, so as to detect the amount of movement of the corresponding one of the shafts 17c, 17c. As shown in FIG. 2, these sensors 21, 21 are electrically connected to a measuring unit 22 to supply detection signals thereto. In the illustrated embodiment, the reference condition of each of these sensors 21, 21 is set at the condition in which the corresponding detector plate 15 is oriented in parallel with the refence straight line H of the present system. Thus, the turn table 14 is caused to turn over an angle corresponding to the angle defined between the wheel 2 and the system reference straight line H, and the corresponding amount of movement of each of the shafts 17c, 17c is detected by the respective sensors 21, 21 with the detected information being supplied to the measuring unit 22. It is to be noted that in the preferred embodiment as illustrated, the values obtained by the sensors 21, 21 are differentially processed to calculate the angle of inclination of the wheel 2 with respect to the system reference straight line H.

As shown in FIG. 2, the present system includes four such measuring units 22, one for each wheel 2, and these measuring units 22 are all electrically connected to a computer 23, where the values from each of the measuring units 22 are suitably processed to determine the inclination of each of the wheels 2 with respect to the system reference line H thereby calculating the toe angle of each of the wheels 2. The computer 23 is also electrically connected to a front wheel toe angle display device 24a and a rear wheel toe angle display device 24b, which display the toe angles of the wheels 2 thus calculated by the computer 23. Of course, the front and rear wheel toe angle display devices 24a and 24b may be integrated, if desired.

In operation, the automobile 1 is driven into the system such that its four wheels 2 ride on the respective floating tables 18, which are temporarily locked in position. After releasing the floating tables 18 from the locked condition, air under pressure is introduced into each of the air cylinders 17, so that the paired detector plates 15, 15 are moved closer together to sandwich the wheel 2 therebetween. In this case, the contact plate 15a of detector plate 15 is securely brought into surface contact with the side surface of the wheel 2 while producing a relative motion with respect to the support member 15 through the spacer 15b as described previously, and the turn table 14 is caused to rotate around the shaft 43 over an angle corresponding to the angle of inclination of the wheel 2 with respect to the system reference line H. The amount of movement of each of the shafts 17c, 17c is detected by the sensors 21, 21 and the detected values are supplied to the measuring unit 22.

As may be seen in FIG. 4, the wheel 2 typically rides on the floating table 18 with the center plane $C_1$ of the wheel 2 being slightly deviated from the center plane $C_2$ of the turn table 14. However, since the floating table 18 and support plate 12 are provided to be freely movable in predetermined directions, as the detector plates 15, 15 are brought into pressure contact with the wheel 2 from both sides as described above, the center plane $C_1$ of the wheel 2 on the floating table 18 is automatically brought into alignment with the center plane $C_2$ of the turn table 14 with ease without requiring appreciable driving forces.

As described above, the amount of movement of each of the shafts 17c, 17c detected by the pair of sensors 21, 21 is supplied to the corresponding measuring unit 22 where the inclination of the wheel 2 with respect to the system reference line H is calculated. The thus calculated inclination of each of the wheels 2 is then supplied to the computer 23, where the information is processed according to a predetermined program to calculate the toe angle of each of the wheels 2, i.e., the inclination of each of the wheels 2 with respect to the longitudinal direction D of the automobile under test. Then, the thus calculated toe angles are displayed at the devices 24a, 24b. Accordingly, while observing the current toe angle values displayed, an operator may adjust the inclination of each of the wheels 2 until the right and left wheels 2 are set equal in toe angle. When so set, the steering wheel is also properly aligned with respect to the longitudinal direction D of the automobile under test.

As a modified structure, the floating tables 18 may be disposed of, if desired. In this case, the wheels 2 to be tested are placed directly on the support beams 19, 19 which are fixedly attached to the ground surface G on both ends. Furthermore, by appropriately defining the system reference line, the equalizers 13, 13 may also be disposed of. In this case, the rails 11, 11 do not need to be provided as extending from end to end in the pit, and they may be provided only partially over the range of movement of the support plate 12. In addition, only one sensor 21 may be provided for measuring the inclination of each of the wheels 2. Besides, an angle sensor (not shown) may be provided on the shaft 16a which pivotally connects the detector plate 15 to the stay 16, if desired, in which case, the camber of the wheel 2 may be detected at the same time.

Figure 6:
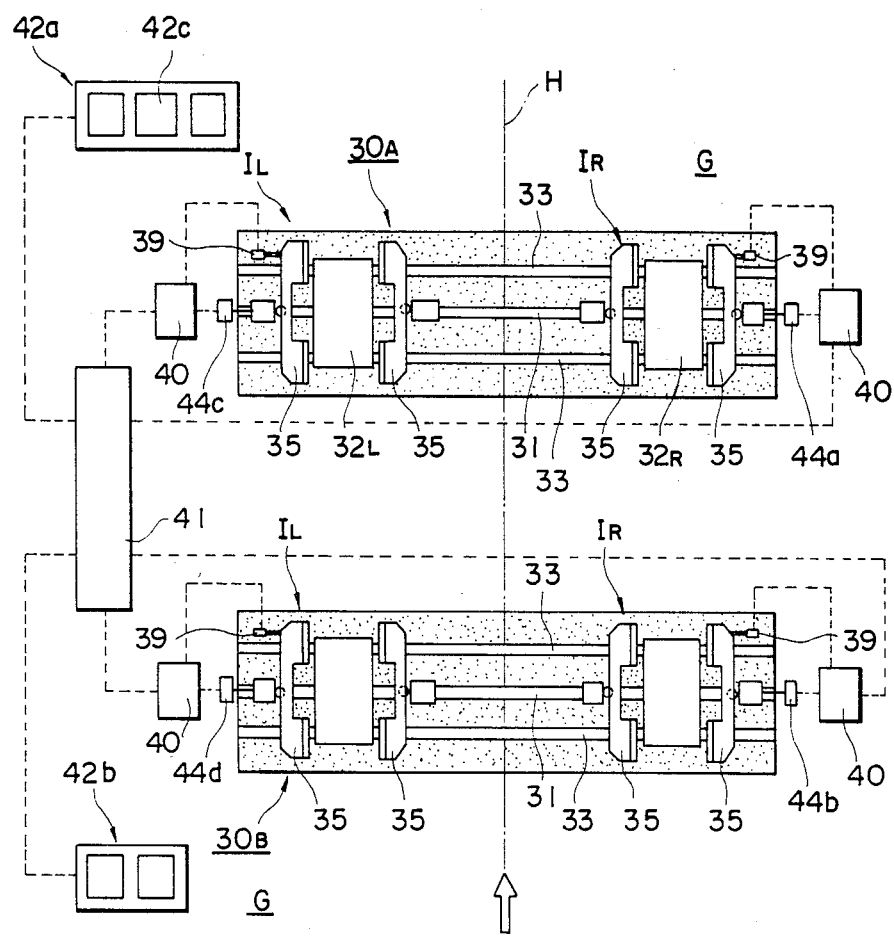
FIG. 6 is a schematic illustration showing another system for measuring the inclination of wheels of an automobile constructed in accordance with another embodiment of the present invention.

FIG. 6 schematically illustrates another system for measuring the inclination of the wheels of an automobile constructed in accordance with another embodiment of the present invention. As shown, similarly with the previously described system, the present system includes a front wheel measuring section $30_A$ and a rear wheel measuring section $30_B$, which are also generally defined in the form of the pit in the ground. Each of the measuring sections 30 includes a pair of support beams 33, 33, which extend horizontally in parallel and spaced apart from each other with both their ends fixedly attached to the ground surface G, and a pair of floating tables $32_R$, $32_L$ being movable along the pair of support beams 33, 33. In each of the measuring sections 30, rails 31 are fixedly provided at the bottom of the pit extending horizontally and spaced apart from each other. The rail 31 in the front wheel measuring section $30_A$ is in parallel with the rail 31 in the rear wheel measuring section $30_B$. It is to be noted that one of the rails 31 may be provided partially as required and not in a continuous manner as shown.

Figure 7:
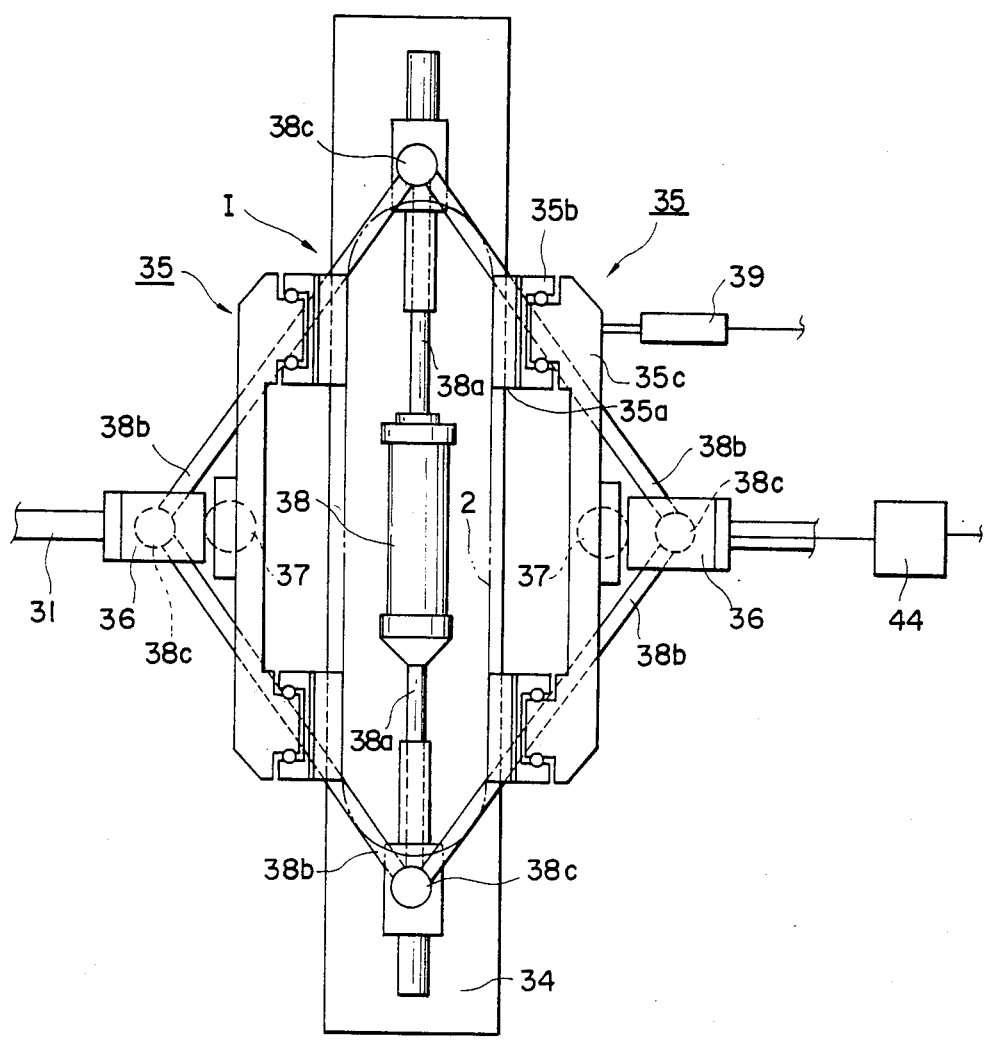
FIG. 7 is a plan view showing in detail one of the toe angle detecting devices provided in the system of FIG. 6.
Figure 8:
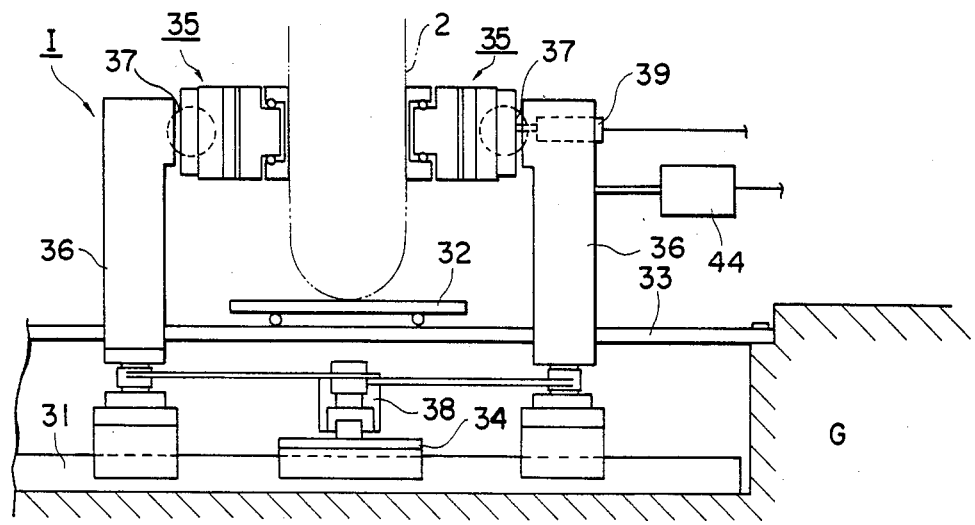
FIG. 8 is a front view of the structure shown in FIG. 7.

On each of the two rails 31, 31 is movably mounted a pair of toe detecting devices $I_R$, $I_L$ which may be used for measuring the inclination of the left and right wheels of an automobile under test. As shown in detail in FIGS. 7 and 8, each of the toe detecting devices I includes a pair of detector plates 35, 35 which may be moved closer together or separated away from each other. That is, each of the detector plates 35, 35 is supported at its center to be pivotal three-dimensionally at the top of the stay 36 through a ball joint 37, and the stay 36 rides slideably on the rail 31. Between the oppositely arranged detector plates 35, 35 is provided an air cylinder 38 fixedly mounted on a slide table 34, which is slidable along the rail 31, and perpendicular to the rail 31. A pair of rods 38a, 38a are provided in the air cylinder 38 to project or retract in opposite directions. The outer ends of the rods 38a, 38a are operatively connected to the bottom ends of both of the stays 36, 36 by means of link levers 38b. In particular, each lever 38b has its one end pivotally connected to the outer end of the rod 38a at 38c and the other end pivotally connected to a pivot 38c defined at the bottom of the stay 36 at its center. With such a structure, similarly with the previously described embodiment, through the operation of the air cylinder 38, the pair of oppositely arranged stays 37, 37 and thus the associated detector plates 35, 35 may be moved closer together or separated away from each other as guided by the rail 31, so that the detector plates 35, 35 may be pressed against the wheel 2 from both sides, as shown in FIG. 8.

There is provided a sensor 39 for each of the four toe angle detecting devices such that the forward end of the sensor 39 is in contact with one end of a support member 35c of the detector plate 35 thereby allowing to detect the amount of movement of that portion of the support member 35c, and the sensor 39 is electrically connected to an associated measuring unit 40 as shown in FIG. 6. It is to be noted that each of the sensors 39 is so arranged that the reference (zero) condition is established when the detector plate 35 is directed perpendicular to the rail 31. Thus, when the paired detector plates 35, 35 are pressed against the wheel 2, they are moved pivotally three-dimensionally around the ball joint 37 in accordance with the angle of inclination of the wheel 2, whereby the sensor 39 detects the amount of movement of the point in contact thereby supplying a detection signal to the measuring unit 40, where the angle of inclination of the wheel 2 with respect to the straight line perpendicular to the rail 31 is calculated. Each of the four measuring units 40, each receiving a detection signal from an associated sensor 39, is electrically connected to a computer 41. Each of the measuring units 40 is also connected to an associated one of other sensors 44a–44d, which are used to detect an off-center value of the longitudinal center line of the automobile under test from the imaginary reference line H of the measuring system. The computer 41 is electrically connected to a front wheel toe angle display device 42a including an off-center indicating portion 42c and to a rear wheel toe angle display device 42b.

The operation of the present embodiment is approximately the same as that of the previous embodiment. In the previous embodiment, the toe angle detecting device I on the turn table 14 as a whole rotates in carrying out toe angle measurements; in accordance with the present embodiment, those elements which move rotatingly following the inclination of the wheel 2 are only the pair of detector plates 35, 35.

As possible modifications of the present embodiment, the sensor 39 may be provided more than one for each of the wheels 2 so as to increase the level of measuring accuracy. Moreover, an appropriate angle sensor may be mounted on the ball joint 37 so as to allow to directly measure the camber of the wheel 2 as well.

Figure 9:
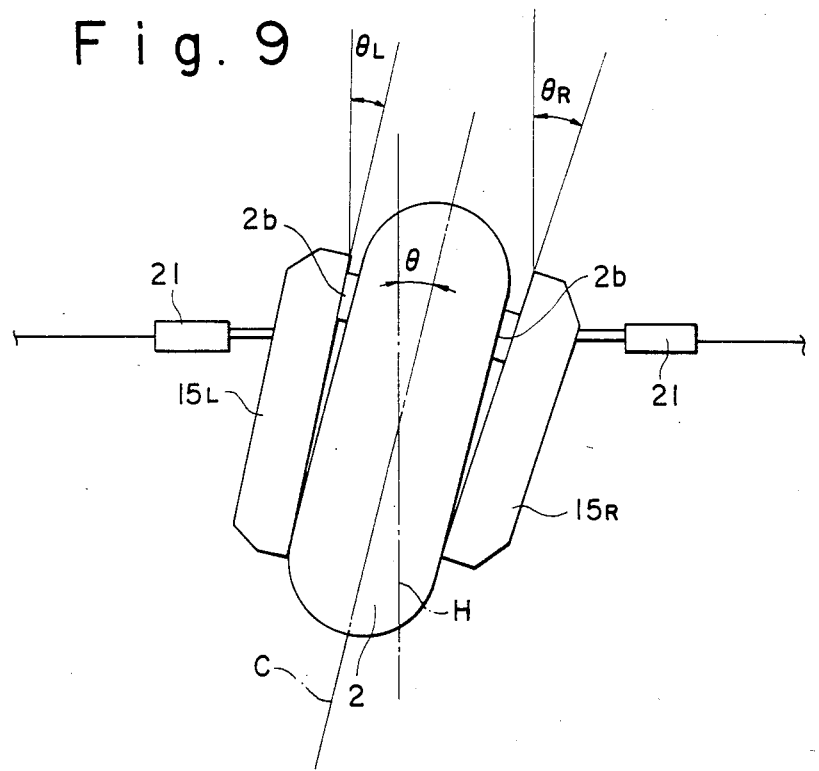
FIG. 9 is a schematic illustration showing a modified structure of the present invention.

FIG. 9 schematically illustrates a still further modification in which the sensor 21 is provided one for either side of the wheel 2 thereby allowing to detect the inclination of each of the paired detector plates 15, 15 independently as different from the above-described embodiments wherein only one of the paired detector plates 15, 15 is detected for its inclination. Such a structure is practically quite advantageous because the errors, for example, caused by partial protrusions 2b formed at the side of the wheel 2 or tire for indicating the tire manufacturer may be minimized in measurement of inclination of the wheel 2. Described more in detail in this respect with reference to FIG. 9, in which the left and right detector plates $15_L$ and $15_R$ are pressed against the wheel 2 on both sides partly in abutment against the local protrusions 2b, designating the angle of inclination of the right detector plate $15_R$ with respect to the system reference line H by $\theta_R$ and the angle of inclination of the left detector plate $15_L$ with respect to the reference line H by $\theta_L$, the angle of inclination of the center plane of the wheel 2 with respect to the reference line H may be expressed in the following manner, assuming that the protrusions 2b are formed symmetrically on both sides of the wheel 2.

$$\theta = (\theta_R + \theta_L)/2$$

Figure 10:
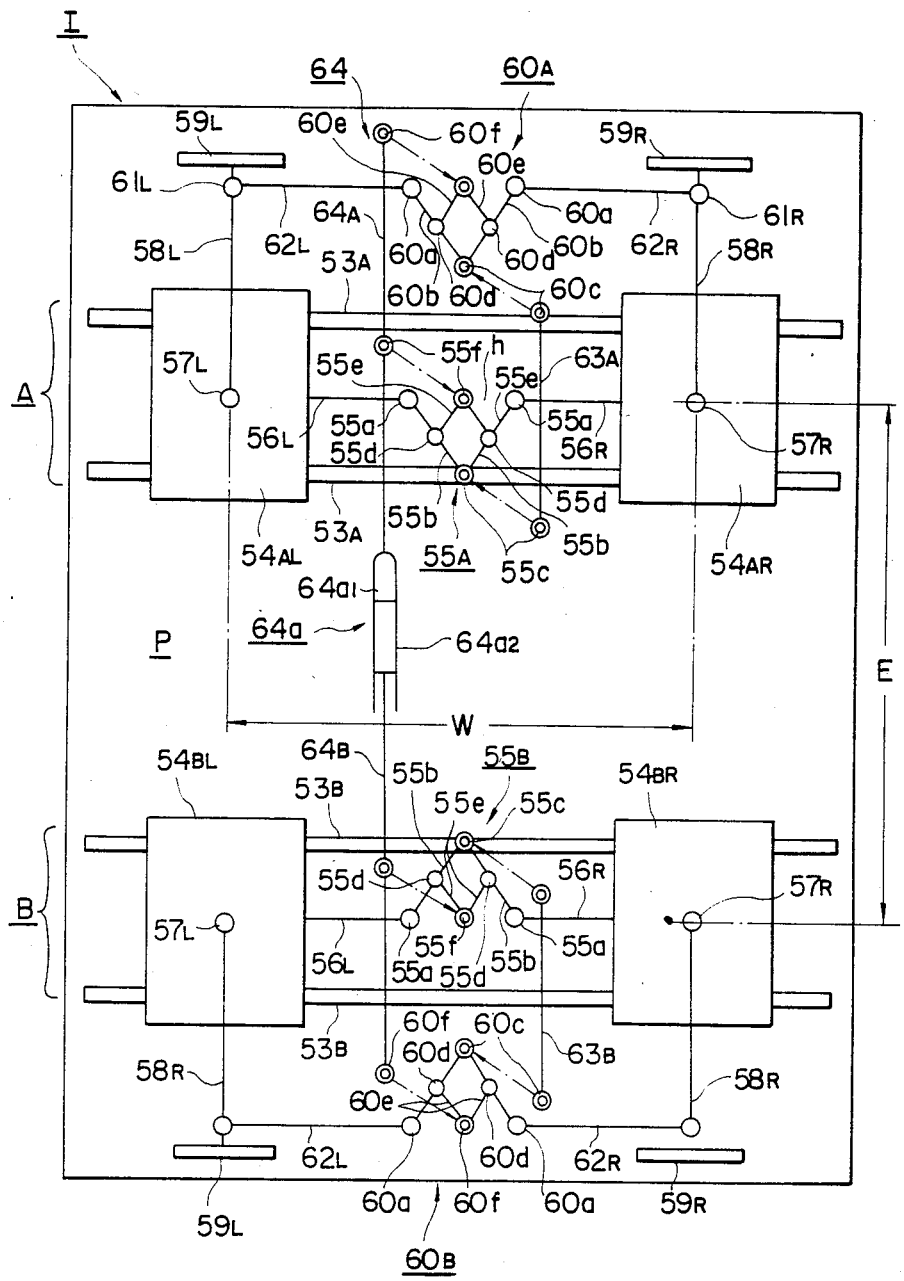
FIG. 10 is a schematic illustration showing a further system for measuring the inclination of the wheels of an automobile constructed in accordance with a further embodiment of the present invention.
Figure 11:
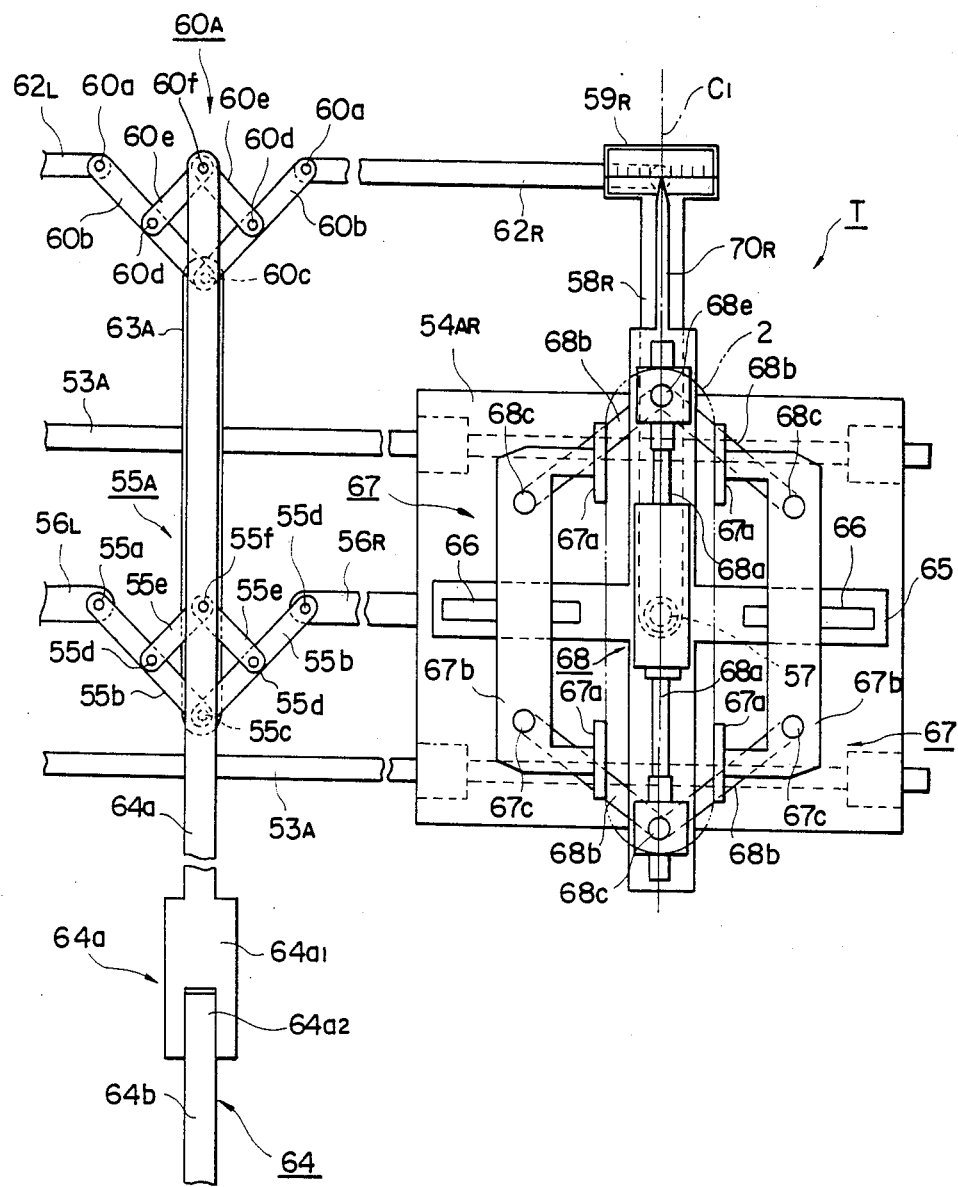
FIG. 11 is a plan view showing in detail one of the toe angle detecting devices provided in the system of FIG. 10.
Figure 12:
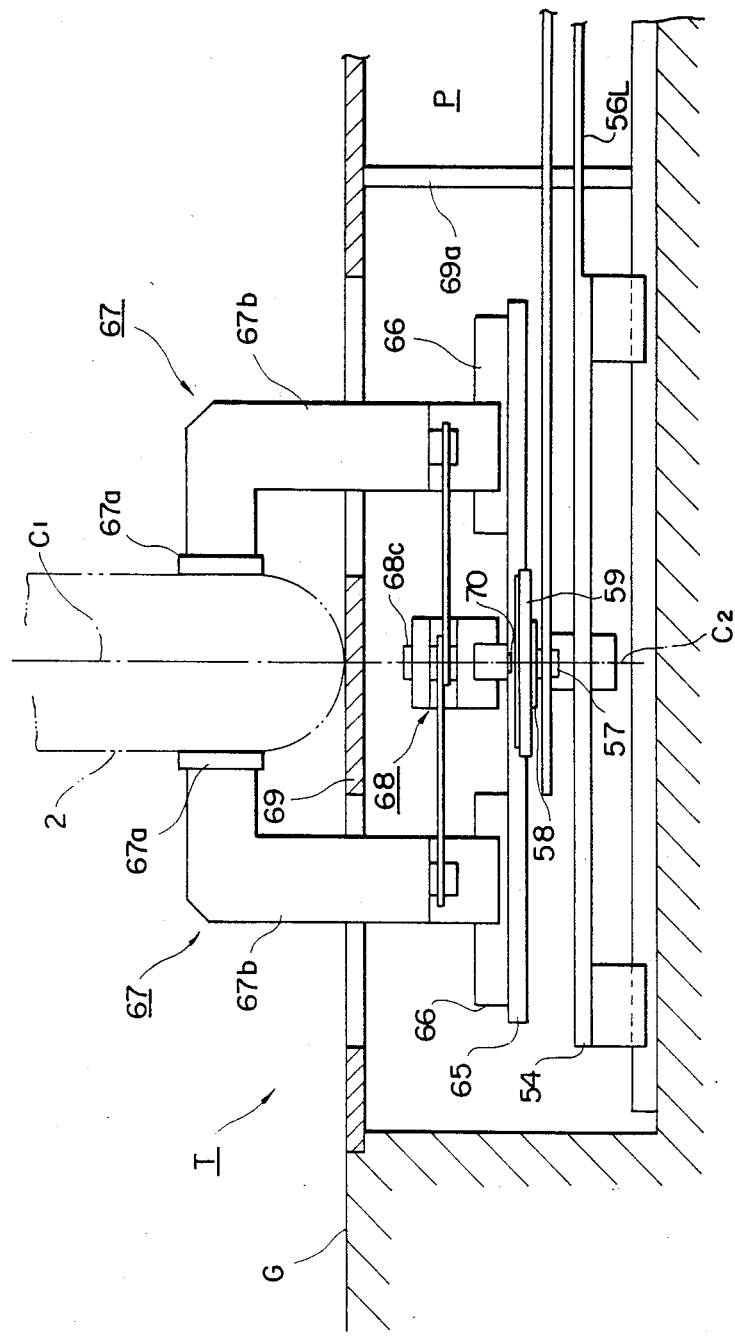
FIG. 12 is a front view of the structure shown in FIG. 11.

Referring now to FIGS. 10–12, there is shown a further embodiment of the present invention. FIG. 10 illustrates the overall structure of the system for measuring the inclination of the wheels of a four-wheeled automobile constructed in accordance with a further embodiment of the present invention, in which the main portions are exploded for the purpose of illustration and a toe angle detecting device T for each wheel 2 is removed. FIG. 11 shows in detail the toe angle detecting device T provided for each of the four wheels 2 of an automobile under test with the floating table 54 removed. FIG. 12 is a front view showing the structure of FIG. 11. As shown in FIG. 10, in a generally rectangular pit P formed in the ground surface, there are provided two pairs of rails 53A, 53A and 53B, 53B extending horizontally in parallel thereby each pair defining a front wheel measuring section A and a rear wheel measuring section B. The center-to-center distance E between these pairs of rails 53A—53A and 53B—53B is set equal to the wheel base of an automobile under test. As described previously, these pairs of rails 53A—53A and 53B—53B may be so structured to be adjustable in spacing thereby allowing to apply for various automobiles different in wheel base distance.

A pair of support plates 54AL, 54AR are movably mounted on the pair of rails 53A, 53A therealong and another pair of support plates 54BL, 54BR are movably mounted on the pair of rails 53B, 53B. On each of the support plates 54 is mounted a toe angle detecting device which will be described in detail later. The pair of support plates 54AL, 54AR movably mounted on the same pair of rails 53A, 53A are operatively connected through a pantagraph type connector 55A, and, similarly, the pair of support plates 54BL, 54BR are operatively connected through another pantagraph type connector 55B. Thus, the distance between the left and right support plates may be suitably varied so that the present system may be applied to automobiles different in wheel separation.

Describing the structure of the pantagraph type connector 55A in the front wheel measuring section A, horizontal rods 56L and 56R fixedly attached to the support plates 54AL and 54AR, respectively, extend in parallel with the rails 53A oppositely closer together. First arms 55b, 55b are pivotally connected to the forward ends of the horizontal rods 56L, 56R at pivots 55a, 55a, respectively, and these first arms 55b, 55b are pivotally connected at their forward ends at pivot 55c. A pivot 55d is provided at mid-point of each of the first arms 55b, 55b and a pair of second arms 55e, 55e, which are half as long as the first arms 55b, are pivotally connected to the respective pivots 55d, 55d. The pair of second arms 55e, 55e have their other ends pivotally connected together. With the pantagraph type connector 55A constructed as described above, even if the distance W between the left and right support plates 54AL and 54AR varies, the position of the pivot 55f may be maintained on a straight line h defined by connecting the two horizontal rods 56L and 56R. In other words, the pivot 55f freely moves along the line h in accordance with changes in distance W and is always located at the center of distance W.

Figure 13:
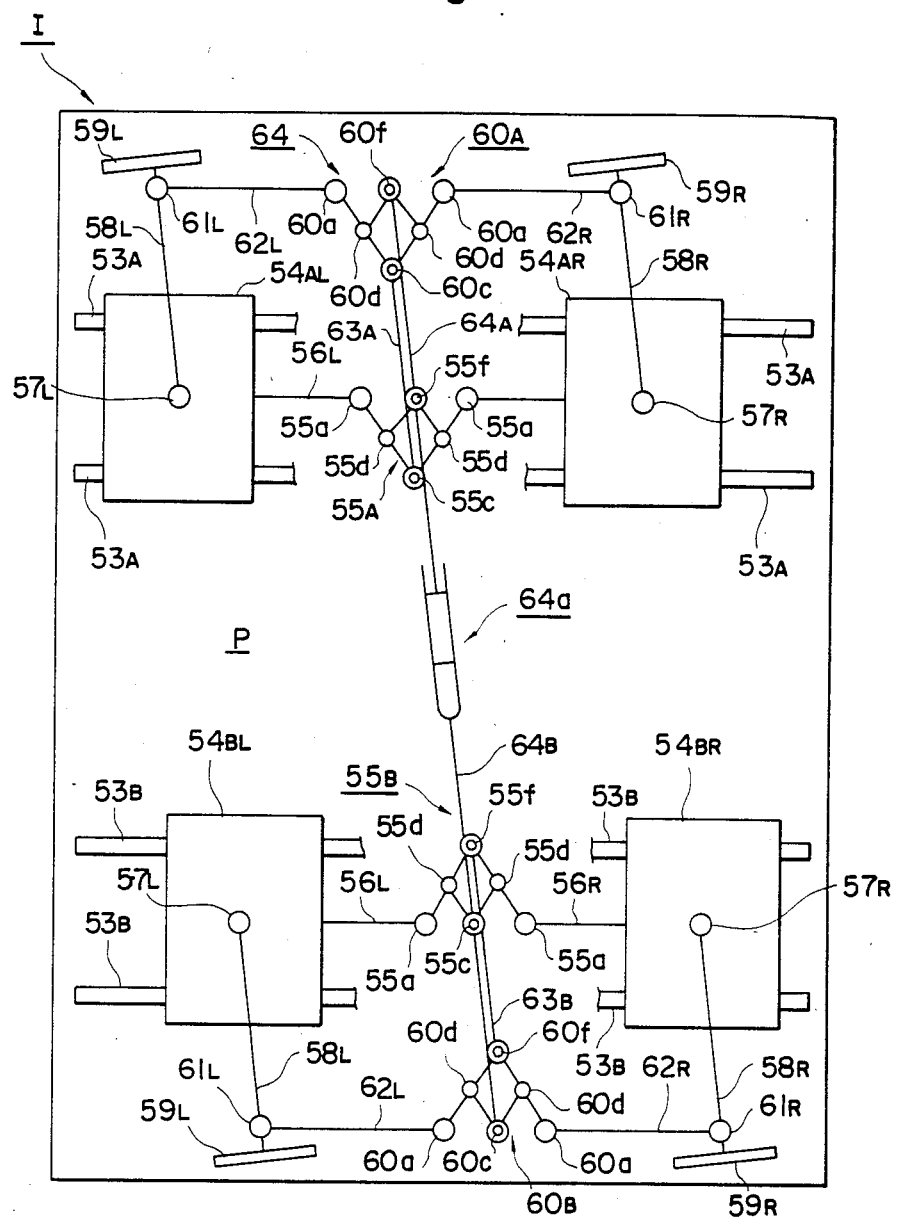
FIG. 13 is a schematic illustration showing a still further system for measuring the inclination of the wheels of an automobile constructed in accordance with a still further embodiment of the present invention.

The support plates 54AL, 54AR have shafts 57L, 57R at the center, and vertical rods 58L, 58R extending vertically corresponding to the longitudinal direction of an automobile under test are pivotally connected to the shafts 57L, 57R, respectively. At the forward end of each of the vertical rods 58L, 58R, there is provided a scale plate 59L, 59R which may be used to indicate the toe angle of the corresponding wheel 2. The scale plate 59 is fixedly attached to the vertical rod 58 with the reference (zero) point in alignment with the longitudinal direction of the vertical rod 58. Thus, even if the vertical rods 58 are inclined with respect to the reference center line of the system as shown in FIG. 13, the reference (zero) point of the scale plate 59 remains at the longitudinal axis of the vertical rod 58.

The pair of vertical rods 58L, 58R are operatively connected at their forward end portions by another pantagraph type connector 60A which is similar in structure to the previously described pantagraph type connector 55A. Described more in detail, horizontal rods 62L, 62R, substantially same in length as the previously mentioned horizontal rods 56L, 56R, are pivotally connected to the respective vertical rods 58L, 58R at pivots 61L, 61R, and the pantagraph type connector 60A including a pair of first arms 60d, 60d and second arms 60e, 60e, which are all pivotally connected via pivots 60a, 60a, 60c, 60d, 60d and 60f. Thus, the pivot 60f is insured to always remain at a mid-point between the pivots 60a and 60a.

The two pantagraph type connectors 55A and 60A are interconnected by a synchronizing rod 63A. In this case, the length of the rod 63A is so set that all of the pivots 61L, 60a, 60f, 60a and 61R lie in a straight line in parallel with the rails 53A. The synchronizing rod 63A has its both ends pivotally connected to the pivot 55c of pantagraph 55A and to the pivot 60c of pantagraph 60A, so that the corresponding pairs of horizontal rods 56L–62L and 56R–62R are synchronized in operation. Thus, even if the support plates 54AL, 54AR shift in position during toe angle measurement, the distance between the pivots 61L and 61R is always maintained equal to the distance W between the support plates 54AL and 54AR and at the same time the horizontal rods 62L, 62R are maintained in parallel with the rails 53A. That is, the quadrilateral defined by the pivots 57L, 61L, 61R and 57R always remain a parallelogram.

On the other hand, also in the rear wheel measuring section B, a similar pantagraph type connector 55B is provided as operatively connected between the right and left support plates 54BL, 54BR, and like elements are indicated by like numerals. Accordingly, even if the support plates 54BL and 54BR are shifted in position sideways along the rails 53B depending on the manner of advancement of the automobile to be tested, the quadrilateral defined by the pivots 57L, 61L, 61R and 57R always remain to be a parallelogram.

Also provided is a connection rod 64 including a length adjustment section 64a for operatively coupling the pair of support plates 54AL, 54AR on the rails 53A, 53A to the pair of support plates 54BL, 54BR on the rails 53B, 53B. The connection rod 64 includes a front rod 64A for the front wheel measuring section A and a rear rod 64B for the rear wheel measuring section B, which are connected by the length adjusting section 64a for adjusting the entire length of the connection rod 64. The length adjusting section 64a is comprised of a retainer $64a_1$ in the form of a cylinder with its one end open and a slider $64a_2$ which is slidably fitted into the retainer $64a_1$, and, thus, while maintaining the front and rear rods 64A and 64B lying along a straight line, the entire length of the connection rod 64 may be suitably adjusted.

Figure 14:
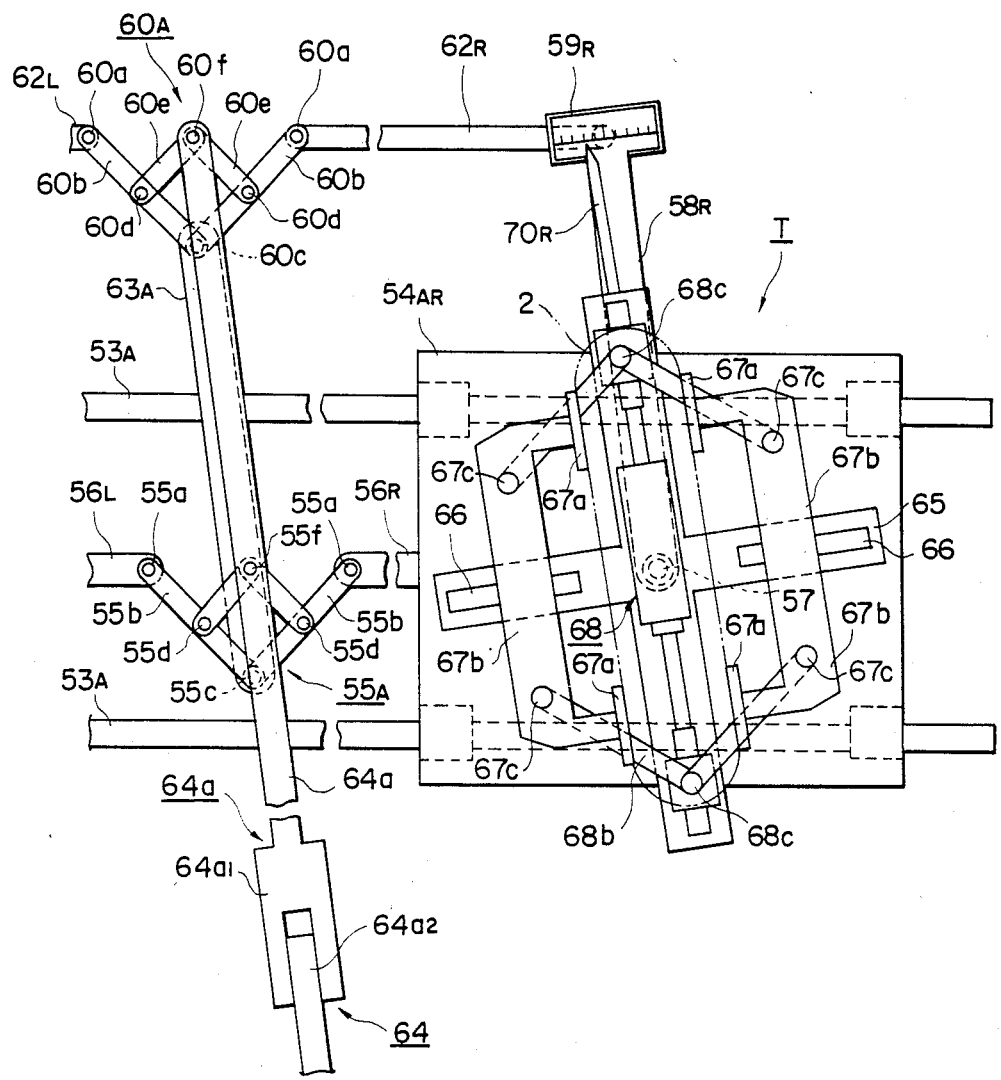
FIG. 14 is a plan view showing in detail one of the toe angle detecting devices provided in the system of FIG. 13.

Preferably, the forward end of the front rod 64A is pivotally connected to the pantagraph type connector 60A at the pivot 60f and the front rod 64A is also pivotally connected to the pivot 55f of the other pantagraph type connector 55A. Similarly, the rear rod 64B is pivotally connected to the pantagraph type connectors 55B, 60B at pivots 55f, 60f, respectively. With the provision of such connection rod 64, the longitudinal center line of an automobile to be tested may be always brought into alignement with the lengthwise direction of the connection rod 64 automatically. As is obvious from the above description, each of the vertical rods 58 is always maintained in parallel with the connection rod 64 through the above-mentioned link mechanism so that even in the case in which the connection rod 64 is inclined with respect to the longitudinal direction as shown in FIGS. 13 and 14, the direction of each of the vertical rods 58 is always maintained in parallel with the longitudinal center direction of the automobile to be tested. As mentioned before, the longitudinal center line of an automobile to be tested is defined as a straight line extending between the centers of front wheel and rear wheel treads.

The toe angle detecting device T is mounted on each of the four support plates 54 as will be described below. With particular reference to FIGS. 11 and 12, a turn table 65 formed in the shape of a cross is supported to be rotatable around the shaft 57 which is provided at the center of the support table 54 and to which the vertical rod 58 is also pivotally connected.

On the cross-shaped turn table 65 is fixedly mounted a pair of guide rails 66, 66 spaced apart from each other and in alignment, and a pair of detector members 67, 67 to be pressed against the wheel 2 from both sides for measuring the toe angle thereof are slidably mounted on the guide rails 66, 66. In the illustrated embodiment, the detector member 67 includes a pair of detector plates 67a, 67a spaced apart from each other and a support member 67b for supporting the pair of detector plates 67a, 67a, whereby the pair of detector plates 67a and 67a are brought into pressure contact against one side surface of the wheel 2 for measuring the toe angle thereof. Between the pair of oppositely arranged detector members 67, 67 and oriented perpendicular to the rails 66 is disposed an air cylinder 68 having a pair of rods 68a, 68a which project and retract in opposite directions. The forward ends of these rods 68a, 68a are pivotally connected to link levers 68b, which are pivotally connected to the respective ends of the support member 67b at pivots 67c and 68c. Thus, when air under pressure is introduced into the air cylinder 68 as supplied from a pressurized gas source (not shown), the rods 68a, 68a project in the opposite directions, so that the pair of detector members 67, 67 are brought closer together as guided by the guide rails 66, 66 thereby securely holding the wheel 2 therebetween. It is to be noted that in the illustrated embodiment the support beams 69 for supporting thereon the wheels 2 in position are held in flush with the ground surface with the help of pillars 69a extending upright from the bottom of the pit P.

As best shown in FIG. 11, a needle 70 is fixedly mounted on the cross-shaped turn table 65 with its tip end generally located at the scale plate 59 fixedly mounted on the vertical rod 58. Thus, the needle 70 is positioned to lie in a longitudinal center plane $C_1$ of the wheel 2 when properly held between the pair of detector members 67, 67 under pressure.

In operation, an automobile to be tested is driven by itself into the present system such that its four wheels ride on the corresponding support beams 69. In this case, as shown in FIGS. 13 and 14, the automobile tends to be oriented obliquely with respect to the longitudinal direction of the toe angle measuring system I, whereby the longitudinal center line of the automobile is inclined with respect to the longitudinal center line of the measuring system I. In the present system I, however, due to the particular link mechanism, the connection rod 64 becomes always aligned with the longitudinal center line of the automobile automatically. Besides, as mentioned before, through the unique link mechanism, the quadrilateral defined by the points 61, 57, 55f and 60 always remain to be a parallelogram. Thus, the vertical rod 58 pivotally connected to the support plate 54 on which the toe angle detecting device T is mounted is always directed in parallel with the longitudinal center line of the automobile so that the zero point on the scale plate 59 indicates the direction of the longitudinal center line of the automobile. After placing the wheels 2 on the support beams 69, the steering wheel is set to be in alignment with the longitudinal center line of the automobile to be tested.

Then, air under pressure is introduced into the air cylinder 68 so that the paired detector members 67, 67 are moved closer together thereby being brought into pressure contact with the wheel 2 from both sides at the same time. In this instance, the turn table 65 is caused to rotate around the shaft 57 over an angle corresponding to the degree of inclination of the wheel 2 with respect to the longitudinal center line of the automobile. Thus, the direction indicated by the needle 70 fixedly mounted on the turn table 65 comes into agreement with the direction of longitudinal center plane of the wheel 2, and thus a reading on the scale plate 59 indicated by the tip end of the needle 70 is the current toe angle of the wheel 2. Since the zero point of the scale plate 59 is insured to always indicate the direction of the longitudinal center line of the automobile, as mentioned above, there is no need to implement correction depending on the degree of inclination of the automobile to be tested with respect to the reference center line of the measuring system I and the reading on the scale plate 59 indicated by the needle 70 directly indicates the true toe angle of the wheel 2. In this case, if an operator adjusts the toe angle of each of the left and right wheels 2 so as to bring the readings of the left and right scale plates 59 indicated by the needles 70 to be identical, the steering wheel may be brought into proper alignment with the advancing direction of the automobile.

In the above described embodiment, a pantagraph type connector is provided between the left and right support plates; however, in the case where automobiles to be tested all have the identical tread separation, such a pantagraph connector may be discarded. In this case, it is only necessary to have the connection rod 64 pivotally connected to mid points between the pivots 61L and 61R and between the pivots 57L and 57R. It should also be noted that the pit P may be provided individually for each of the front and rear wheel measuring sections A and B, and the rails 53 may be provided partly as required.

Figure 15:
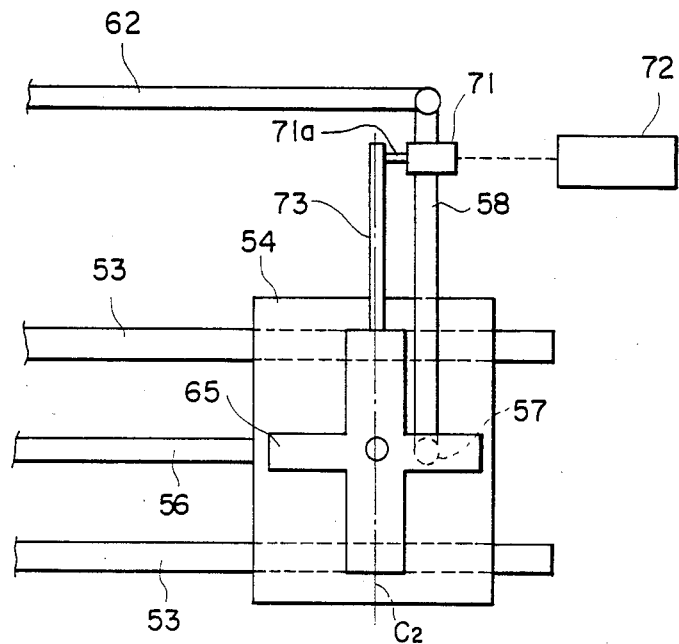
FIGS. 15 and 16 are schematic illustrations showing a modified structure of the present invention.

FIG. 15 shows a modified structure of the above embodiment. In this case, the vertical rod 58 is connected to the shaft 57 which is located at a position separated away from the center of the support plate 54 over a distance in the direction separating further away from the longitudinal center line of the automobile, and the sensor 71 is fixedly mounted on the vertical rod 58. The sensor 71 is connected to a display device 72 for displaying the value of the detected toe angle. The sensor 71 has a sensor rod 71a which extends in the direction perpendicular to the vertical rod 58. And actuator rod 73 is fixedly mounted on the turn table 65 extending forward along the center line $C_2$ thereof and the tip end of the sensor rod 71a is in abutment against the actuator rod 73. The remaining structure is similar to that described in the previous embodiment.

Figure 16:
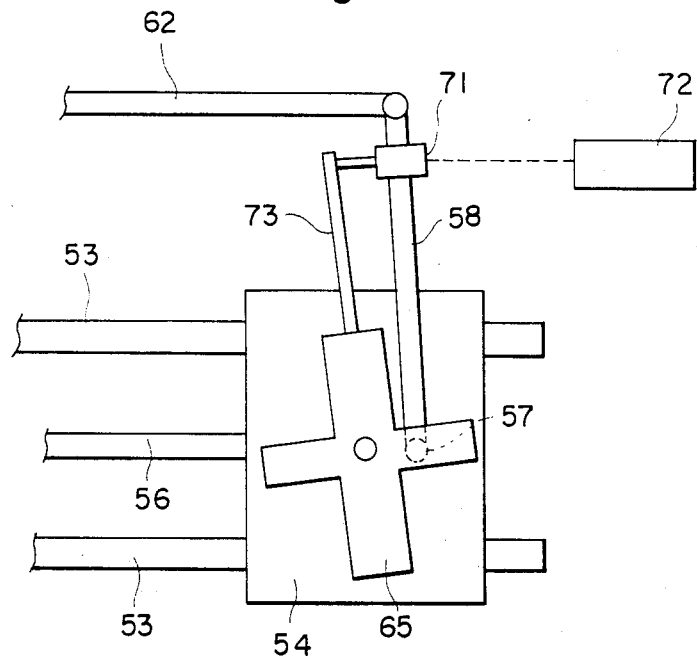

With the above-described modified structure, in the case where the automobile to be tested is inclined with respect to the longitudinal center line of the measuring system I as shown in FIG. 16, the vertical rod 58 is always maintained to be directed in parallel with the longitudinal center line of the automobile similarly with the previous embodiment. Thus, the amount of movement of the actuator rod 73 detected by the sensor 71 fixedly mounted on the vertical rod 58 indicates the degree of inclination of the wheel 2 itself without being affected by the inclination of the longitudinal center line of the automobile, and, thus, the toe angle of each of the wheels 2 may be displayed at the display device 72 after simple calculations without requiring to implement any correctional procedure. In accordance with the present embodiment, the detected toe angle of the wheel 2 may be displayed in digital format with a minimum of cost since it only requires a minimum number of sensors and simple arithmetic calculations.

Figure 17:
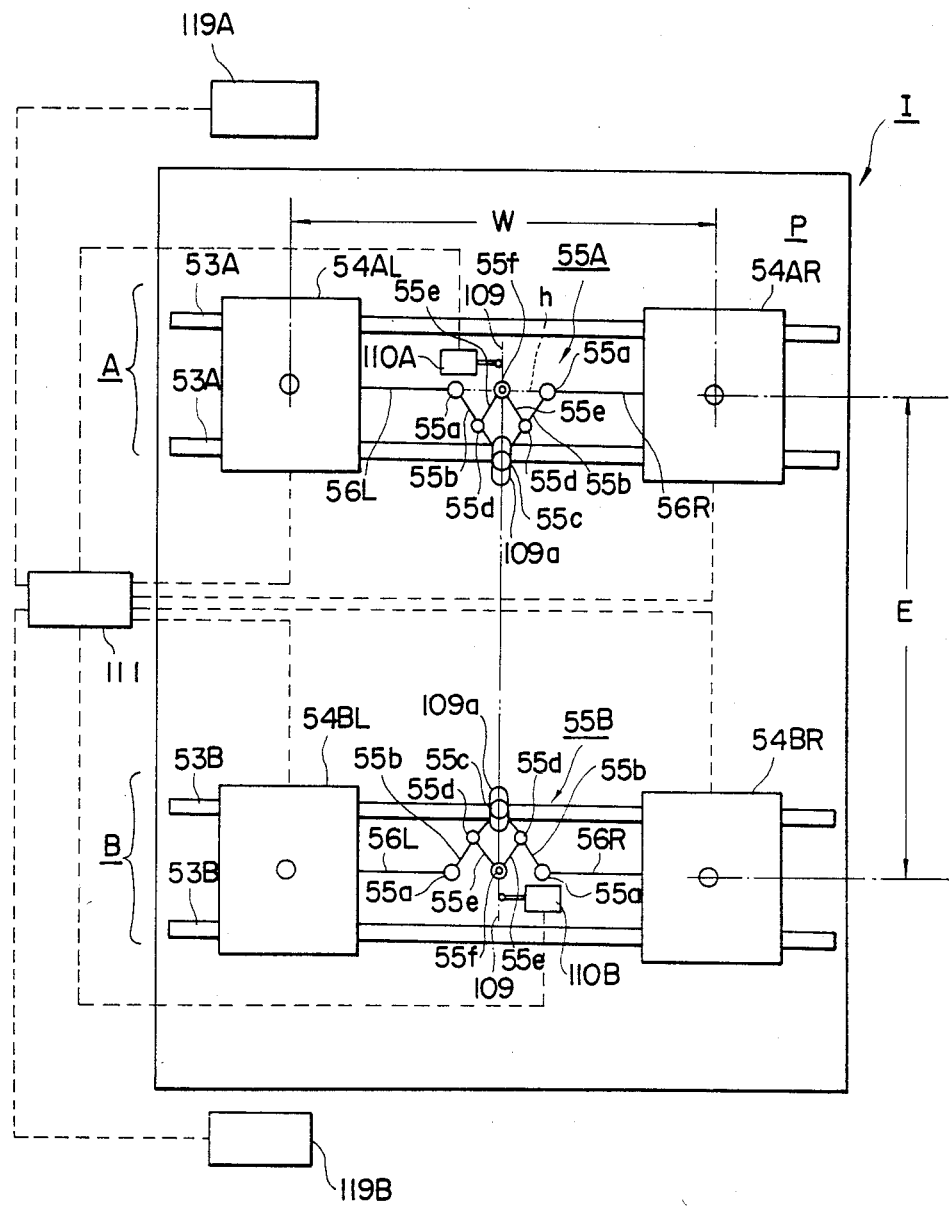
FIG. 17 is a schematic illustration showing a still further system for measuring the inclination of the wheels of an automobile constructed in accordance with a still further embodiment of the present invention.
Figure 18:
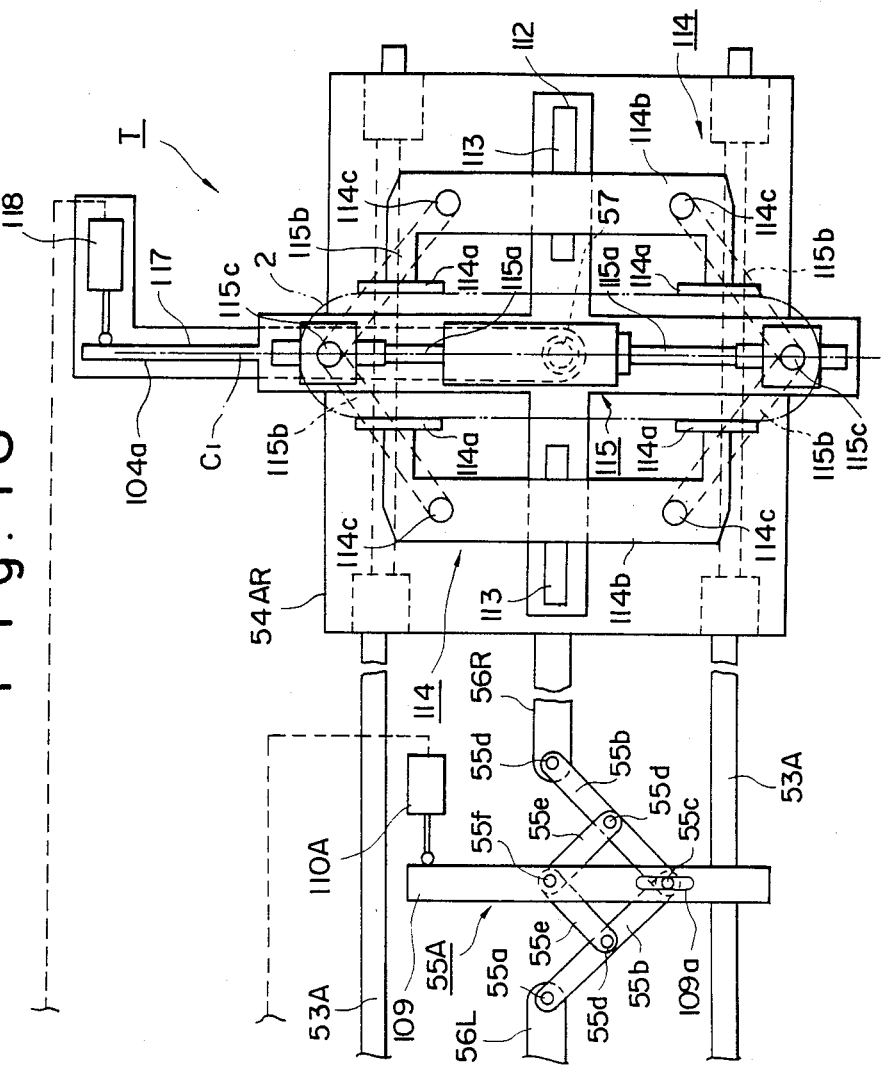
FIG. 18 is a plan view showing in detail one of the toe detecting devices provided in the system of FIG. 17.
Figure 19:
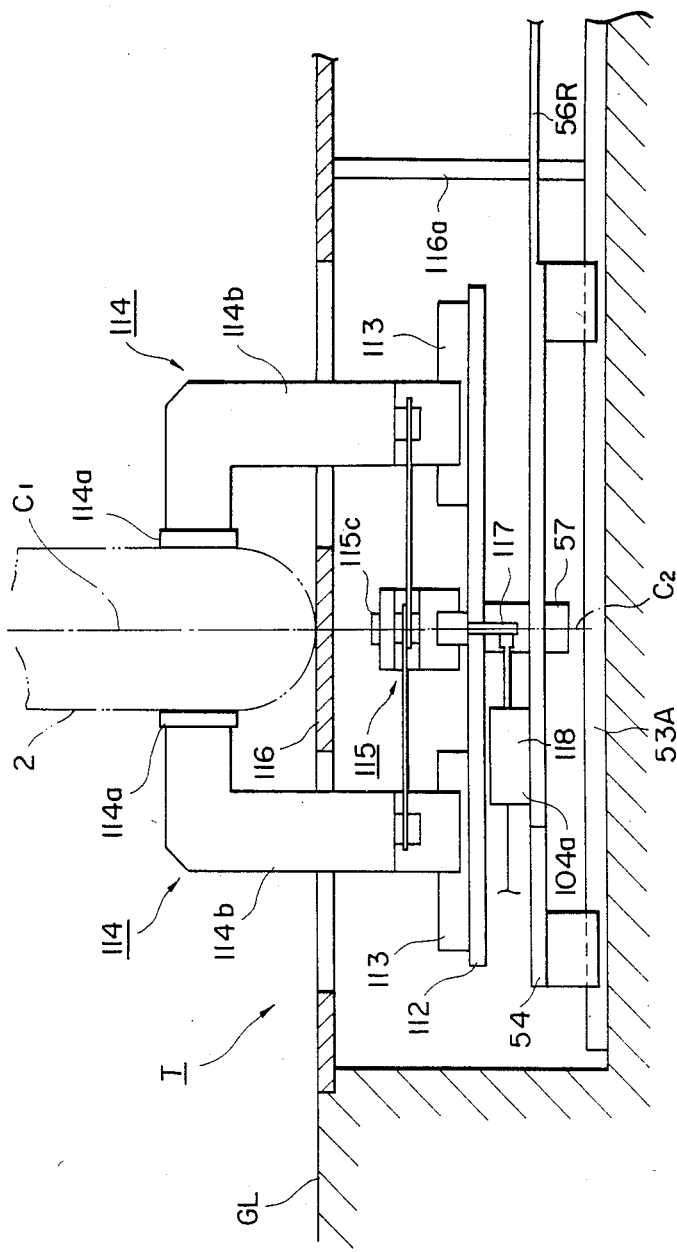
FIG. 19 is a front view of the structure shown in FIG. 18.

FIGS. 17–19 shows yet another measuring the inclination of the wheel of an automobile constructed in accordance with yet another embodiment of the present invention. This embodiment is structurally similar to the embodiment shown in FIGS. 10–12, and thus like elements are indicated by like numerals thereby omitting the repetition of explanation as much as possible. As shown in FIG. 17, the present toe angle measuring system is also provided in the pit P in the shape of a rectangle and extending into the ground from the ground surface on which automobiles run. Unlike the previous embodiment, the present system is provided with an indicator rod 109 for indicating the location of the pivot 55f of the pantagraph type connector 55A in the widthwise direction extending along a straight line connecting between the pivots 55f and 55c. The indicator rod 109 is formed with an elongated slot 109a at one end, and the pivot 55c is loosely received in the elongated slot 109a. The other end of the indicator rod 109 extends beyond the pivot 55f over a predetermined length. In this case, due to the unique characteristic of a pantagraph mechanism, the line defined between the pivots 55c and 55f is perpendicular to the line defined between the pivots 55a and 55a, so that the indicator rod 109 always extends in the direction perpendicular to the widthwise direction even if the center-to-center distance W varies thereby allowing to indicate the position of the pivot 55f in the widthwise direction. It is to be noted that the above-described structure is identically provided for the front and rear wheel measuring sections A and B.

Also provided are position sensors 110A and 110B for sensing the position of the pivots 55f in the widthwise direction of the system I with the tip end of the sensing member in abutment against the corresponding indicator rod 109. In the present embodiment, the indicator rod 109 is always maintained perpendicular to the rails 53A and 53B so that its position directly indicates the position of the pivot 55f in the widthwise direction. The position sensors 110A and 110B are electrically connected to a processor unit 111. As may be recalled, the longitudinal center line of the automobile under test becomes always aligned with the straight line defined by connecting the pivots 55f, 55f of the front and rear wheel measuring sections A and B as indicated by the two-dotted line in FIG. 17. Thus, by calculating the inclination of the straight line extending between the pivots 55f, 55f of the front and rear wheel measuring sections A and B from the respective positions of these two pivots 55f, 55f, the inclination of the longitudinal center line of the automobile under test may be known. That is, designating an angle from the direction perpendicular to the rail 53 by c, detected values of the respective position sensors 110A, 110B by a and b, respectively, and the distance between the sensors by E' (which may be approximated by the wheel base distance E), then the inclination of the longitudinal center line of the automobile under test may be expressed in the following manner.

$$\tan c = (a-b)/E$$

Here, the sign of each of the parameters a and b should be changed depending on whether the movement of the indicator rod 109 is to the right or to the left.

It is to be noted that the indicator rod 109 does not have to be provided at the mid point between the support plates 54AL and 54AR and it may be provided at any point therebetween as long as its position is identical for the front and rear wheel measuring sections A and B. In such a case, the line extending between these two indicator rods 109, 109 disposed at points other than mid points does not coincide in position with the longitudinal center line of the automobile under test, but its direction is parallel to the longitudinal center line of the automobile under test.

FIGS. 18 and 19 illustrate the toe angle detecting device T provided in the system shown in FIG. 17 and this toe angle detecting device T is also structurally similar to the one shown in FIGS. 11 and 12 in many respects though different numerals are used. In the present embodiment, there is also provided a cross-shaped turn table 112 on which is fixedly mounted a pair of guide rails 113, 113. And a pair of detector members 114, 114 are provided to be slidable along the guide rails 113, 113, respectively, such that the detector members 114, 114 may be pressed against the wheel 2 from both sides. The detector member 114 also includes a pair of detector plates 114a, 114a, which are brought into contact with one side surface of the wheel 2, and a support member 114b for supporting the pair of detector plates 114a, 114a. An air cylinder 115 is fixedly mounted on the turn table 112 and a pair of rods 115a, 115a may project or retract in the opposite directions depending on the air pressure inside of the air cylinder 115. These rods 115a, 115a are operatively associated with the pair of detector members 114, 114 via four link levers 115b, which are pivotally connected to the rod 115a and to the detector member 114 on both ends, respectively, through pivots 115c and 114c. Thus, as with the previous embodiment, when air under pressure is supplied to the air cylinder 115, the pair of detector members 114, 114 are moved closer together thereby pressing the wheel 2 from both sides. Also as with the previous embodiment, support beams 116 for supporting thereon the wheels 2 in position are provided with both their ends fixed to the ground surface and intermediate points supported by pillars 116a which extend upright from the bottom of the pit P. Thus, the support beams 116 are generally flush with the ground surface GL.

Also fixedly attached to the turn table 112 is an indicator rod 117 for indicating the orientation of the wheel 2 to be examined projecting in the direction perpendicular to the lengthwise direction of the guide rails 113. Thus, the direction of the indicator rod 117 always coincides with the direction of the center line $C_1$ of the wheel 2 sandwiched between the pair of detector members 114, 114. Also provided is a position sensor 118 to sense the position of the indicator rod 117 in contact therewith. In the illustrated embodiment, the position sensor 118 is mounted on a projection 104a which projects forward from the support plate 54AR and is electrically connected to the processor 111. It is so structured that the position sensor 118 indicates its zero reference point when the associated indicator rod 117 is directed perpendicular to the rails 53.

The processor 111 is also electrically connected to front and rear wheel display devices 119A and 119B, so that when detected inclination information for each of the wheels 2 is inputted into the processor 111, calculations are carried out by implementing corrections using the above-mentioned equation for determing the current inclination of the longitudinal center line of the automobile under test to obtain the toe angle for each of the wheels 2, which is then displayed at the display devices 119A and 119B. In the present embodiment, the front wheel display device 119A is structured to display the spoke angle which may be obtained by processing each of the toe angle values.

Figure 20:
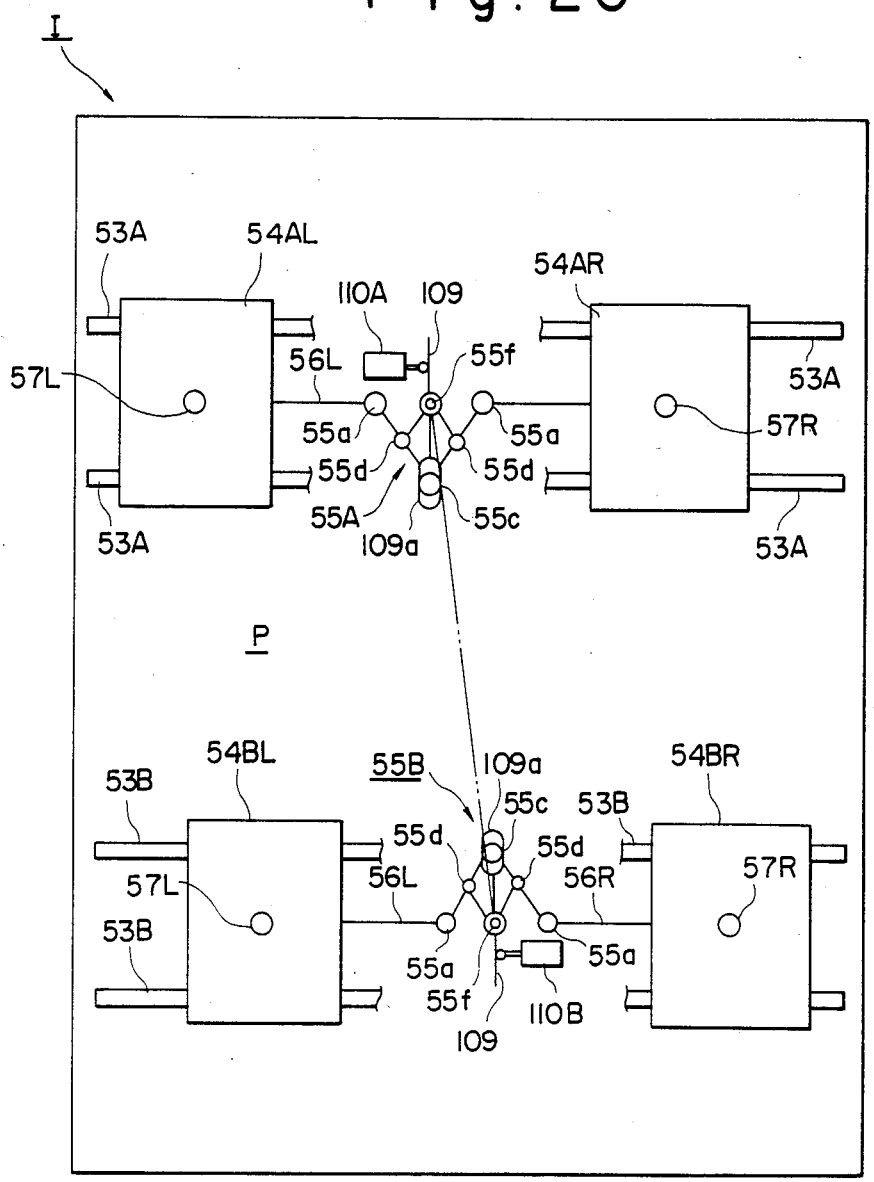
FIG. 20 is a schematic illustration showing the case in which an automobile (not shown) driven into the present system for measuring the toe-angle of each of the wheels is directed at an angle with respect to the imaginary vertical straight line of the system.

In operation, an automobile to be tested is first driven into the present system to ride on the support beams 116. As shown in FIG. 20, it is often the case that the automobile to be tested is directed obliquely so that the longitudinal center line of the automobile to be tested is inclined with respect to the reference center line of the measuring system I. However, in the present system, the longitudinal center line of the automobile to be tested is calculated at the processor 111 from the information supplied from the position sensors 110A, 110B according to the above-noted formula and its information is stored in the processor 111. After setting the automobile to be tested properly on the support beams 116, the steering wheel of the automobile is set at the "straight ahead" position.

Then, air under pressure is supplied into the air cylinder 115 so that the paired detection members 114, 114 are moved closer together whereby they are pressed against the wheel 2 from both sides. In this case, depending on the degree of inclination of the wheel 2, the turn table 112 is caused to rotate around the shaft 57. Thus, the indicator rod 117 fixedly mounted on the turn table 112 comes to be aligned with the center line $C_1$ of the wheel 2 so that the degree of inclination of the wheel 2 may be detected from the degree of inclination of the indicator rod 117. The associated position sensor 118 detects the information of the degree of inclination of the indicator rod 117 and supplies this information to the processor 111, where this information is suitably processed with correction being effected using the stored information for the inclination of the automobile under test and there is finally obtained the inclination of the wheel 2 with respect to the longitudinal center line of the automobile under test, or toe angle of the wheel 2.

Thus the obtained toe angle information is immediately displayed at the display devices 119A and 119B so that an operator may suitably adjust the orientation of each of the wheels 2 while observing the displayed information. In the present embodiment, since the spoke angle is also displayed, it may be confirmed that the spoke angle is within a predetermined range.

Figure 21:
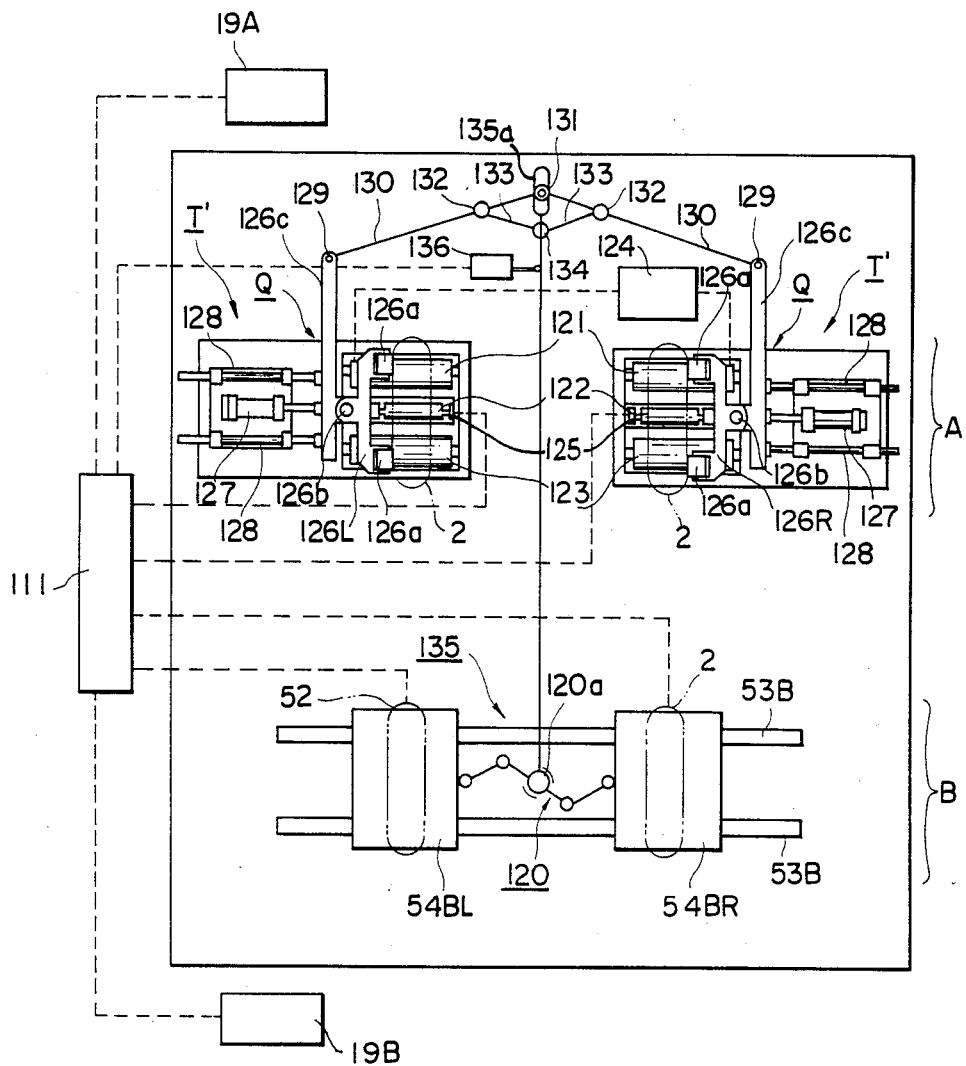
FIG. 21 is a schematic illustration showing a still further system for measuring the inclination of the wheels of an automobile constructed in accordance with a still further embodiment of the present invention.

Referring now to FIG. 21, a still further embodiment of the present invention will be described. As shown, the present embodiment of the toe angle measuring system also includes a front wheel measuring section A and a rear wheel measuring section B. The front wheel measuring section A of the present system includes a pair of left and right toe angle detecting devices T', T', each of which is so structured to carry out a toe angle detecting operation while keeping the wheel to be measured in rotation. On the other hand, the rear wheel measuring section B includes a pair of support tables 54BL and 54BR which are provided to be movable in the horizontal direction and operatively coupled by an equalizer 120. It is to be noted that those elements which are identical to those provided in the previous embodiments are indicated by like numerals as much as possible.

The structure of the rotary type toe angle detecting device T' provided in the front wheel measuring section A will now be described in detail below. As shown in FIG. 21, the device T' includes three rollers 121, 122 and 123 which are arranged in parallel and supported to be rotatable and on which the wheel 2 to be measured rides. Among the three rollers 121-123, the center roller 122 is smaller in diameter than the other two front and rear rollers 121 and 123, and it is the roller used for detecting the toe angle of the wheel 2. The center roller 122 is mounted to rotate around its center axis and freely pivot in a plane which is perpendicular to the wheel 2. Among the other two rollers, one of them (or front roller 121 in the illustrated embodiment) is operatively coupled to a driving source 124 and this driving roller is driven to rotate at high speed during a toe angle measuring operation to cause the wheel 2 to be driven to rotate. The toe angle detecting roller 122 is operatively coupled to a servo-motor (not shown) which is structured to be controlled in accordance with the thrust acting on the toe angle detecting roller 122 in its axial direction. Also operatively connected to the roller 122 is a potentiometer 125 which is then electrically connected to the processor unit 111. Thus, if the wheel 2 on the roller 122 is inclined with respect to the axial direction of the roller 122, when the roller 121 is driven to rotate to cause the wheel 2 to rotate on the roller 122, there is produced a thrust acting on the roller 122 in its axial direction and the thrust thus produced is converted and amplified into a large power which is then used to drive the servo-motor thereby causing the center roller 122 to pivot until it comes to the position where there is no thrust. The current position of the roller 122 without thrust is then detected by the potentiometer 125 and its detection signal is supplied to the processor unit 111 as the information indicating the inclination of the wheel 2, whereby the toe angle of the wheel 2 is calculated.

Figure 22:
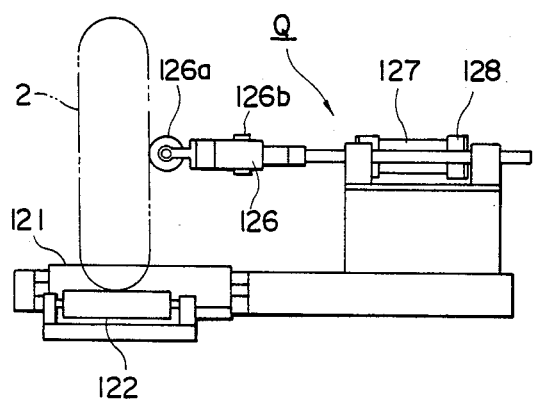
FIG. 22 is a front view showing a main part of the structure shown in FIG. 21.

As also shown in FIG. 22, above the rollers 121-123 is disposed a position detecting device Q for detecting the position of the wheel 2 riding on the rollers 121-123. The position detecting device Q includes a detector member 126 provided with a pair of contact rollers 126a, 126a, which are brought into rolling contact with one side surface of the wheel 2, and an air cylinder 127 having a reciprocatingly movable guide rod 128 having the detector member 126 pivotally mounted at its forward end. That is, the detector member 126 is pivotal around a pivot 126b in a plane normal to the plane of the wheel 2 so that the detector member 126 may pivot following the inclination of the wheel 2 with respect to the reference center line of the system.

The left and right detector members 126L and 126R are operatively coupled as in the following manner. The detector member 126L or 126R is integrally provided with a connector section 126c, which projects forward over a predetermined distance, and one end of a horizontal rod 130 is pivotally connected to the forward end of the connector section 126c at a pivot 129. The other end of the horizontal rod 130 is pivotally connected to the other end of the corresponding other horizontal rod 130 at a pivot 131. Also provided is a pair of arms 133, 133 whose one ends are pivotally connected at pivot 134 and the other ends are pivotally connected to the respective horizontal rods 130, 130 at pivots 132, 132. Thus, in effect, the rods 130 and arms 133, which are pivotally connected to each other and to the connector sections 126c, 126c define a pantagraph type connector. As is obvious, the pivot 131 remains located at the mid point between the left and right detector members 126L and 126R, or left and right wheels 2 and 2, and to this pivot 131 is loosely connected one end of a connector rod 135 which extends and establishes an operative association between the front and rear wheel measuring sections A and B. Described in detail, the top end of the connector rod 135 is provided with an elongated slot 135a extending along the lengthwise direction of the rod 135, and the pivot 131 is loosely fitted in this elongated slot 135a.

Also provided in the vicinity of the pivot 134 is a position sensor 136 for detecting the amount of movement of the forward portion of the connector rod 135, and this sensor 136 is electrically connected to the processor unit 111, whereby the sensor 136 detects the deviation a of the forward portion of the connector rod 135 from the reference position and supplies this information to the processor unit 111. The reference position or line of the present system is defined as a longitudinal center line between the left and right toe angle detecting devices T', T'.

In the rear wheel measuring section B, the toe angle measuring device T as described previously is mounted on each of the left and right support plates 54BL and 54BR, which are operatively coupled by the equalizer 120. As described previously, the equalizer 120 has a stationary center point pivot 120a, through which the above-mentioned longitudinal center line of the system passes. Thus, the left and right support plates 54BL and 54BR are always located equidistantly from the center pivot 120a. The rear end of the connector rod 135 is pivotally connected to the stationary pivot 120a. With such a structure, just by detecting the amount of deviation of the forward portion of the connector rod 135 from the longitudinal reference line of the system using the position sensor 136, the degree of inclination of the longitudinal center line of the automobile under test may be measured. In other words, in the above-mentioned equation, it is only necessary to determine the inclination c with the parameter b setting always equal to zero.

Figure 23:
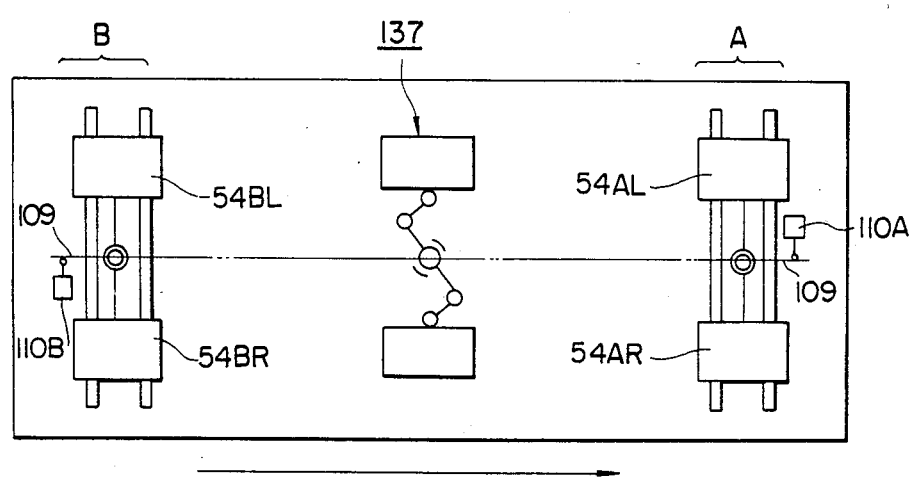
FIG. 23 is a schematic illustration showing a still further system for measuring the inclination of the wheels of an automobile constructed in accordance with a still further embodiment of the present invention.

As an alternative structure, the rotary type toe angle detecting device T' may also be provided for the rear wheel measuring section B as well, if desired. FIG. 23 shows a still further modification of the above-described embodiment, which includes the front and rear wheel measuring sections A and B, which are spaced apart in the longitudinal direction twice the wheel base distance of an automobile to be tested, and an intermediate section 137, which is comprised of pair of left and right support plates operatively coupled by an equalizer. In this embodiment, the automobile to be tested is first located between the intermediate section 137 and the rear wheel measuring section B to carry out toe angle measurements for the rear wheels, and, then, the automobile to be tested is moved to ride on the front wheel measuring section A and the intermediate section 137 to carry out toe angle measurements for the front wheels.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. Apparatus for measuring the inclination of a wheel of a vehicle with respect to a predetermined reference line, comprising:
   first supporting means for supporting said wheel in position;
   aligning means for aligning said vehicle with reference to said reference line; and
   detecting means for detecting the inclination of said wheel with respect to said reference line, said detecting means including a pair of detector units, which are generally spaced apart from each other thereby allowing said wheel to be inserted therebetween and which are provided to move closer together to be pressed against said wheel from both sides, second supporting means for supporting said pair of detector units freely rotatable, driving means for driving to move said pair of detector units, and sensing means for sensing the degree of inclination of said wheel when said detector units are pressed against said wheel from both sides.

2. Apparatus of claim 1 wherein said inclination is a toe angle of said wheel and said reference line is a longitudinal center line of said vehicle.

3. Apparatus of claim 2 wherein each of said detector units includes a support section which is movable closer to or separated away from said wheel in position as guided by a guide rail, an intermediate section which is supported on said support section to be freely movable in a first direction, and a contact section which is supported on said intermediate section to be freely movable in a second direction, which is perpendicular to said first direction, whereby said contact section is brought into contact with the corresponding side surface of said wheel when said support section is moved closer to said wheel.

4. Apparatus of claim 3 wherein said first direction is a vertical direction and said second direction is a horizontal direction.

5. Apparatus of claim 3 wherein said support section is comprised of a first support portion engaged with said guide rail and a second support portion which is pivotally supported on said first support portion and which supports said intermediate section.

6. Apparatus of claim 1 wherein said second supporting means includes a support plate placed on a guide member to be freely movable along said guide member and a shaft mounted on said support plate extending vertically to which said pair of detector units are operatively connected to be rotatable around said shaft.

7. Apparatus of claim 6 wherein said driving means includes a driving unit and a link mechanism for linking said pair of detector units, whereby said pair of detector units are always located equidistantly from said shaft when operated by said driving unit.

8. Apparatus of claim 7 wherein said driving unit is an air cylinder.

9. Apparatus of claim 1 further comprising display means for displaying said inclination of said wheel detected by said detecting means.

10. Apparatus of claim 9 further comprising processing means connected between said detecting means and said display means, said processing means processing information received from said detecting means in accordance with a predetermined procedure and to supply the thus processed data to said display means for display.

11. Apparatus of claim 10 wherein said processing means includes a computer.

12. Apparatus for measuring the inclination of a wheel of a vehicle with respect to a predetermined reference line, comprising:
first supporting means for supporting said wheel in position;
aligning means for aligning said vehicle with reference to said reference line; and
detecting means for detecting the inclination of said wheel with respect to said reference line, said detecting means including a pair of detector units, which are generally spaced apart from each other thereby allowing said wheel to be inserted therebetween and which are provided to move closer together to be pressed against said wheel from both sides, second supporting means for supporting said pair of detector units freely rotatable, driving means for driving to move said pair of detector units, and indicating means for directly indicating said inclination of said wheel when said pair of detector units are pressed against said wheel from both sides as driven by said driving means.

13. Apparatus of claim 12 wherein said second supporting means includes a first support plate, which may be set in position varyingly, and a second support plate, which is rotatably supported on said first support plate around a vertical shaft provided in said first support plate and includes guiding means for guiding the movement of said pair of detector units, wherein said indicating means includes a needle integrally provided in said second support plate and a scale plate fixedly provided in said aligning means, whereby said inclination of said wheel is indicated by a reading on said scale plate pointed by said needle.

14. Apparatus for measuring the inclination of individual wheels of a four-wheeled vehicle with respect to a reference line, comprising:
a first pair of left and right supporting means, which are provided to be movable closer together or separated away from each other, for supporting thereon the front left and right wheels of said vehicle;
a second pair of right and left supporting means, which are provided to be movable closer together or separated away from each other, for supporting thereon the rear left and right wheels of said vehicle;
first link mechanism for operatively connecting said first pair of left and right supporting means;
second link mechanism for operatively connecting said second pair of left and right supporting means;
interconnection means for operatively interconnecting said first and second link mechanisms such that a longitudinal center line of said vehicle is made parallel to the longitudinal direction of said interconnecting means when the wheels of said vehicle are placed on said first and second pairs of supporting means, said interconnection means establishing said reference line;
detecting means mounted on each of said supporting means for detecting the inclination of said wheel supported on the corresponding supporting means with respect to said reference line when activated; and
indicating means for indicating the inclination of said wheels thus detected by said detecting means.

15. Apparatus of claim 14 wherein each of said first and second link mechanisms always maintains a parallelogram relation.

16. Apparatus of claim 15 wherein said interconnection means includes a length adjusting means thereby allowing said interconnection means to change its overall length automatically.

17. Apparatus of claim 14 wherein said indicating means includes a scale plate fixedly mounted on said first link mechanism at a predetermined position and a needle provided in said detecting means for indicating a reading on said scale plate when said detecting means is activated whereby said reading provides said inclination of said wheel with respect to said reference line.

18. Apparatus of claim 17 wherein said inclination is a toe angle of said wheel with respect to said longitudinal center line of said vehicle.

19. Apparatus of claim 18 wherein said longitudinal center line is defined as a line extending between the centers of the tread between the two front wheels and the tread between the two rear wheels of said vehicle.

20. A method for determining the inclination of a wheel of a vehicle, comprising the steps of:
   locating said vehicle in a measuring site;
   detecting a deviation between a longitudinal center line of said vehicle thus located in said measuring site and a predetermined reference line of said measuring site;
   detecting the tentative inclination of said wheel with respect to said predetermined reference line; and
   correcting the detected value of said tentative inclination using said detected deviation to produce the information relating to the inclination of said wheel with respect to said longitudinal center line of said vehicle.

21. The method of claim 20 wherein said vehicle is a four-wheeled vehicle having two front wheels and two rear wheels, and said longitudinal center line is defined as a straight line extending between the center of the tread between said two front wheels and the center of the tread between said two rear wheels.

22. Apparatus for measuring the inclination of individual wheels of a four-wheeled vehicle, comprising:
   a first pair of left and right supporting means, which are provided to be movable closer together or separated away from each other, for supporting thereon the front left and right wheels of said vehicle;
   a second pair of right and left supporting means, which are provided to be movable closer together or separated away from each other, for supporting thereon the rear left and right wheels of said vehicle;
   first link mechanism for operatively connecting said first pair of left and right supporting means;
   second link mechanism for operatively connecting said second pair of left and right supporting means;
   interconnection means for operatively interconnecting said first and second link mechanisms such that a longitudinal center line of said vehicle is made parallel to the longitudinal direction of said interconnecting means when the wheels of said vehicle are placed on said first and second pairs of supporting means;
   sensing means operatively associated with said interconnecting means for sensing an angular deviation of a longitudinal center line of said vehicle from a reference line of said apparatus;
   detecting means mounted on each of said supporting means for detecting the inclination of said wheel supported on the corresponding supporting means with respect to said reference line when activated; and
   processing means for processing information received from said sensing means and said detecting means to calculate said inclination of each of said wheels with respect to said longitudinal center line of said vehicle.

23. Apparatus of claim 22 further comprising display means for displaying said calculated inclination of each of said wheels.

24. Apparatus of claim 23 wherein said longitudinal center line of said vehicle is defined as a straight line extending between the center of the tread between the two front wheels and the center of the tread between the two rear wheels.

25. Apparatus of claim 22 wherein each of said first and second link mechanisms includes a pantagraph type connector.

26. Apparatus of claim 25 wherein said pantagraph type connector includes a stationary pivot point and said interconnecting means includes an elongated rod extending between said stationary pivot points.

* * * * *